(12) United States Patent
Nishijima

(10) Patent No.: US 10,069,427 B2
(45) Date of Patent: Sep. 4, 2018

(54) SWITCHING POWER SUPPLY APPARATUS

(71) Applicant: FUJI ELECTRIC CO., LTD., Kawasaki-shi, Kanagawa (JP)

(72) Inventor: Kenichi Nishijima, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/446,483

(22) Filed: Mar. 1, 2017

(65) Prior Publication Data
US 2017/0294844 A1 Oct. 12, 2017

(30) Foreign Application Priority Data

Apr. 6, 2016 (JP) ................................ 2016-076423
Aug. 18, 2016 (JP) ................................ 2016-160788

(51) Int. Cl.
H02M 3/335 (2006.01)
H02M 3/337 (2006.01)
H02M 1/00 (2006.01)

(52) U.S. Cl.
CPC ...... H02M 3/33569 (2013.01); H02M 3/3376 (2013.01); H02M 2001/0058 (2013.01); Y02B 70/1433 (2013.01)

(58) Field of Classification Search
CPC ......... H02M 2001/0058; H02M 3/005; H02M 2003/1557; H02M 2007/4818;
(Continued)

(56) References Cited

U.S. PATENT DOCUMENTS

2008/0077337 A1 3/2008 Yoshinaga
2009/0284991 A1 11/2009 Nishikawa
(Continued)

FOREIGN PATENT DOCUMENTS

JP H03-215166 A 9/1991
JP 2003-150660 A 5/2003
(Continued)

OTHER PUBLICATIONS

Tomonori Yamada et al., "Estimation of the EMI Reduction by Spread Spectrum Clock", Technical Report of IEICE. EMCJ-94, pp. 37-42, Dec. 2001.

*Primary Examiner* — Timothy J Dole
*Assistant Examiner* — Bryan R Perez
(74) *Attorney, Agent, or Firm* — Rabin & Berdo, P.C.

(57) ABSTRACT

A switching power supply apparatus includes a switching circuit, a resonance circuit, a rectifying circuit, and a control circuit. The switching circuit includes switching elements connected in series between input terminals of a source. The resonance circuit includes an excitation inductor of a primary winding of a transformer, a resonance inductor connected in series with the excitation inductor, and a variable resonance capacitor which is connected in series with the excitation inductor and whose electrostatic capacity changes according to a control voltage. The control circuit generates, on the basis of a feedback voltage, switching signals in which frequency diffusion is given to a switching frequency and the control voltage and outputs the switching signals and the control voltage to simultaneously change the switching frequency and the electrostatic capacity of the variable resonance capacitor.

8 Claims, 27 Drawing Sheets

(58) Field of Classification Search
CPC ..... H02M 2007/4815; H02M 3/33538; H02M 3/33546; H02M 3/33515; H02M 3/33576; H02M 3/33553; H02M 3/33507; H02M 3/33592; H02M 3/33523; Y02B 70/1425; Y02B 70/1491
USPC ................... 363/21.02, 21.03, 15–17, 97–98
See application file for complete search history.

(56) References Cited

U.S. PATENT DOCUMENTS

| | | | |
|---|---|---|---|
| 2012/0098573 A1 | 4/2012 | Sasaki | |
| 2013/0194831 A1* | 8/2013 | Hu | ................... H02M 3/33507 363/21.01 |
| 2015/0092453 A1* | 4/2015 | Ohtake | ............. H02M 3/33507 363/21.02 |

FOREIGN PATENT DOCUMENTS

| | | |
|---|---|---|
| JP | 2009-303474 A | 12/2009 |
| JP | 2012-085131 A | 4/2012 |
| JP | 2012-090499 A | 5/2012 |
| JP | 5591002 B2 | 9/2014 |
| JP | 2015-151798 A | 8/2015 |
| WO | WO-2006/019196 A1 | 2/2006 |

* cited by examiner $$r1$$
$$fr + \Delta f/2 = fs + \Delta f/2 \quad \longleftrightarrow \quad Cvr - \Delta C/2 \quad \longleftrightarrow \quad Vcrin + \Delta V/2$$

$$r2$$
$$fr - \Delta f/2 = fs - \Delta f/2 \quad \longleftrightarrow \quad Cvr + \Delta C/2 \quad \longleftrightarrow \quad Vcrin - \Delta V/2$$

|  | fs = 65k | fs = 80k | fs = 100k |
|---|---|---|---|
| 7 bit (128) | 508 | 625 | 781 |
| 8 bit (256) | 254 | 313 | 391 |
| 9 bit (512) | 127 | 156 | 195 |
| 10 bit (1024) | 63 | 78 | 98 |

UNIT: Hz

FIG. 19

| STATE | SWITCHING FREQUENCY | Cvr | CP1 | CP2 | S1 | S2 |
|---|---|---|---|---|---|---|
| (1) | fs | Cr + Crs1 | H | L | ON | OFF |
| (2) | fs + $\Delta$f/2 | Cr | L | L | OFF | OFF |
| (3) | fs | Cr + Crs1 | H | L | ON | OFF |
| (4) | fs − $\Delta$f/2 | Cr + Crs1 + Crs2 | H | H | ON | ON |
| (5) | fs | Cr + Crs1 | H | L | ON | OFF |

\* Crs1 = Crs2 = $\Delta$C/2
Cr + Crs1 = Cr + $\Delta$C/2
Cr + Crs1 + Crs2 = Cr + $\Delta$C

FIG. 26

SWITCHING POWER SUPPLY APPARATUS

CROSS-REFERENCE TO RELATED APPLICATION

This application is based upon and claims the benefits of priority of the prior Japanese Patent Application No. 2016-076423, filed on Apr. 6, 2016, and the Japanese Patent Application No. 2016-160788, filed on Aug. 18, 2016, the entire contents of which are incorporated herein by reference.

BACKGROUND OF THE INVENTION

1. Field of the Invention

The embodiments discussed herein are related to a current resonance switching power supply apparatus.

2. Background of the Related Art

With LLC converters (current resonance switching power supply apparatus) resonance by two inductors (Ls) and one capacitor (C) is utilized. Therefore, the name "LLC converter" is given. LLC converters are power supply apparatus which are effective in cases where a comparatively high power of 100 W or more is used. Furthermore, LLC converters are characterized by small size (thinness), high efficiency, and low noise. In recent years LLC converters have been in wide use as, for example, power supplies for large-screen liquid crystal display (LCD) TVs.

Formerly the following technique for an LLC converter was proposed. When an output signal of an error amplifier is higher than or equal to a threshold level, on-off of a switching element is controlled on the basis of an output of an oscillation circuit. When an output signal of the error amplifier is lower than the threshold level, on-off of the switching element is controlled with a switching frequency fixed.

Japanese Laid-open Patent Publication No. 2009-303474

With LLC inverters LC resonance (soft switching) is utilized. Therefore, noise is low in a high-frequency band of a MHz band (harmonic band of a switching frequency) compared with flyback converters (hard switching).

However, noise is not low in a low-frequency band (first through severalth harmonic bands, that is to say, a band from several ten kilohertz to several hundred kilohertz) and an anti-noise measure in the low-frequency band depends greatly on filters.

A concrete anti-noise measure is as follows. An electromagnetic compatibility (EMC) filter is located on an AC input line to eliminate noise. With this anti-noise measure, however, the number of filters and size increase. This impedes miniaturization of a power supply.

On the other hand, in order to reduce noise, the following anti-noise measure may be taken. A switching frequency is modulated to give frequency diffusion (jitter). However, if a switching frequency is simply modulated to perform frequency diffusion, then a change in output voltage becomes greater according to the diffusion of a switching frequency.

SUMMARY OF THE INVENTION

According to an aspect, there is provided a switching power supply apparatus including: a switching circuit including a first switching element and a second switching element connected in series between input terminals of a source; a resonance circuit including an excitation inductor of a primary winding of a transformer, a resonance inductor connected in series with the excitation inductor, and a variable resonance capacitor which is connected in series with the excitation inductor and whose electrostatic capacity changes according to an applied control voltage, the resonance circuit being connected in parallel with the second switching element; a rectifying circuit connected to a secondary side of the transformer; and a control circuit which generates switching signals to be supplied to the first switching element and the second switching element on the basis of a feedback voltage generated from a detection result of an output voltage of the rectifying circuit by performing a frequency diffusion on a switching frequency, which generates the control voltage on the basis of the feedback voltage, and which outputs the switching signals and the control voltage to change the switching frequency and the electrostatic capacity simultaneously.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 17 illustrates correspondences between a switching frequency, an electrostatic capacity of the variable resonance capacitor, and a control voltage;

FIG. 19 illustrates an example of setting a modulation frequency;

FIG. 26 illustrates a list of parameters in each state of frequency diffusion.

DETAILED DESCRIPTION OF THE INVENTION

Embodiments will now be described with reference to the accompanying drawings.

Figure 1:
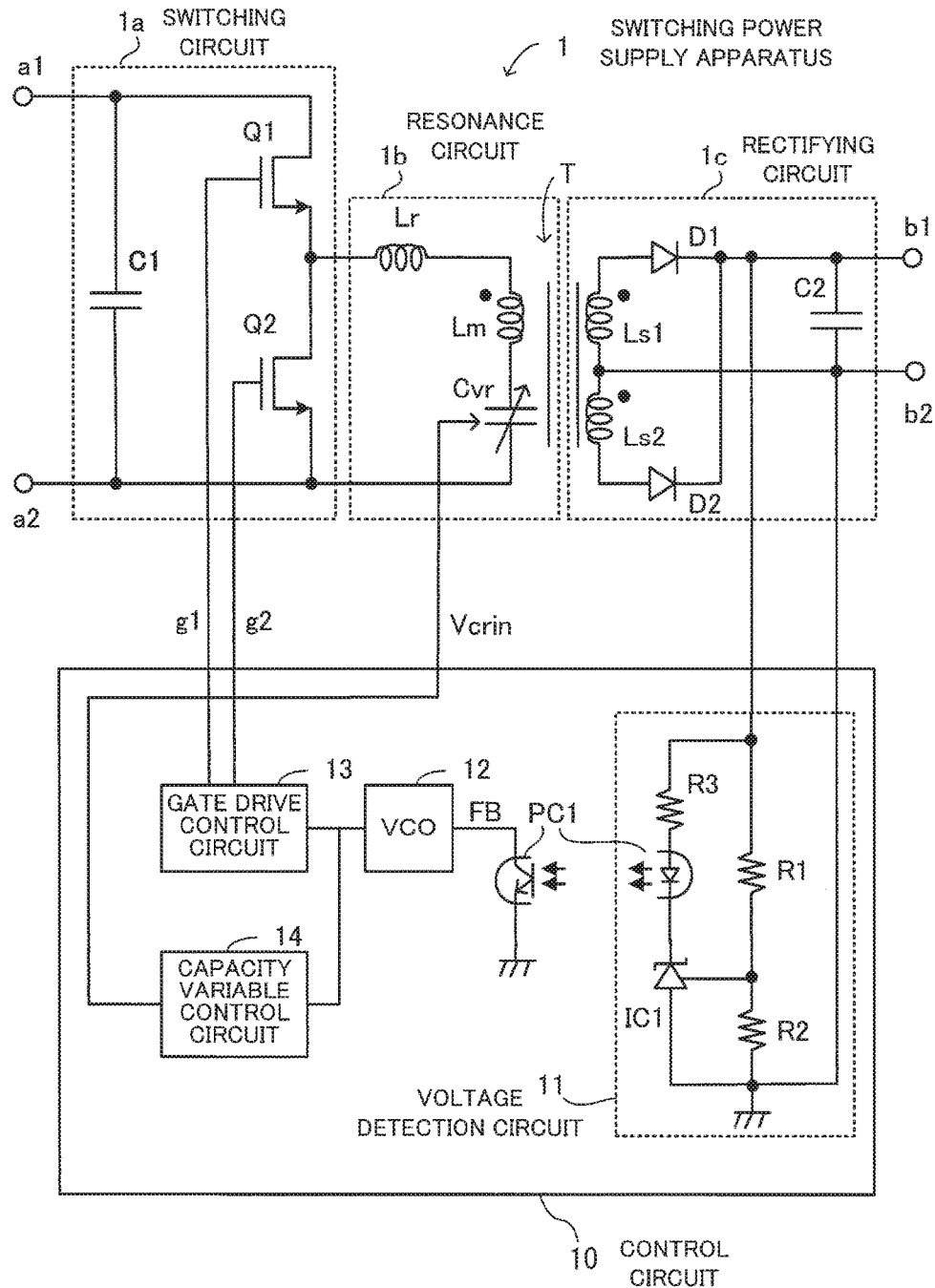
FIG. 1 illustrates an example of the structure of a switching power supply apparatus (in the present disclosure)

FIG. 1 illustrates an example of the structure of a switching power supply apparatus. A switching power supply apparatus 1 includes a switching circuit 1a, a resonance circuit 1b, a rectifying circuit 1c, and a control circuit 10.

The switching circuit 1a includes an input capacitor C1 and a switching element Q1 (first switching element) and a switching element Q2 (second switching element) connected in series between input terminals a1 and a2 of a source. n-channel metal oxide semiconductor field effect transistors (MOSFETs) are used as the switching elements Q1 and Q2.

The resonance circuit 1b includes an excitation inductor Lm of a primary winding of a transformer T, a resonance inductor Lr connected in series with the excitation inductor Lm, and a variable resonance capacitor Cvr connected in series with the excitation inductor Lm. The electrostatic capacity of the variable resonance capacitor Cvr changes according to a control voltage Vcrin applied by the control circuit 10.

The rectifying circuit 1c is disposed on a secondary side of the transformer T and includes inductors Ls1 and Ls2 of a secondary winding of the transformer T, rectifier diodes D1 and D2, and an output capacitor C2.

The control circuit 10 includes a voltage detection circuit 11, photocouplers PC1, a voltage-controlled oscillator (VCO) 12, a gate drive control circuit 13, and a capacity variable control circuit 14. Furthermore, the voltage detection circuit 11 includes resistors R1 through R3, a photodiode of the photocoupler PC1, and a shunt regulator IC1 (details of the control circuit 10 will be described later in FIG. 6).

The control circuit 10 generates a feedback voltage from a detection result of an output voltage of the rectifying circuit 1c. The control circuit 10 then diffuses a switching frequency on the basis of the feedback voltage and generates and outputs switching signals g1 and g2 to be supplied to the switching elements Q1 and Q2, respectively, and a control voltage Vcrin. By doing so, the control circuit 10 changes switching frequencies of the switching signals g1 and g2 and the electrostatic capacity of the variable resonance capacitor Cvr at the same time.

The circuit elements are connected in the following way. One end of the input capacitor C1 is connected to the input terminal a1 and a drain of the switching element Q1. A source of the switching element Q1 is connected to one end of the resonance inductor Lr and a drain of the switching element Q2.

Gates of the switching elements Q1 and Q2 are connected to the control circuit 10. The other end of the resonance inductor Lr is connected to one end of the excitation inductor Lm and the other end of the excitation inductor Lm is connected to one end of the variable resonance capacitor Cvr. The other end of the input capacitor C1 is connected to the input terminal a2, a source of the switching element Q2, and the other end of the variable resonance capacitor Cvr. A control voltage Vcrin outputted from the control circuit 10 is applied to the variable resonance capacitor Cvr.

One end of the inductor Ls1 is connected to an anode of the diode D1. A cathode of the diode D1 is connected to a cathode of the diode D2, one end of the output capacitor C2, an output terminal b1, and the control circuit 10.

One end of the inductor Ls2 is connected to an anode of the diode D2. The other end of the inductor Ls1 is connected to the other end of the inductor Ls2, the other end of the output capacitor C2, an output terminal b2, and the control circuit 10.

As has been described, with the switching power supply apparatus 1 the switching signals g1 and g2 and the control voltage Vcrin are outputted to change switching frequencies of the switching signals g1 and g2 and the electrostatic capacity of the variable resonance capacitor Cvr at the same time. This makes it possible to reduce noise with high accuracy, while suppressing an increase in circuit scale and fluctuations in output voltage.

An ordinary LLC converter and the problems to be solved will now be described by the use of FIGS. 2 through 5 before the details of a technique in the present disclosure are described.

Figure 2:
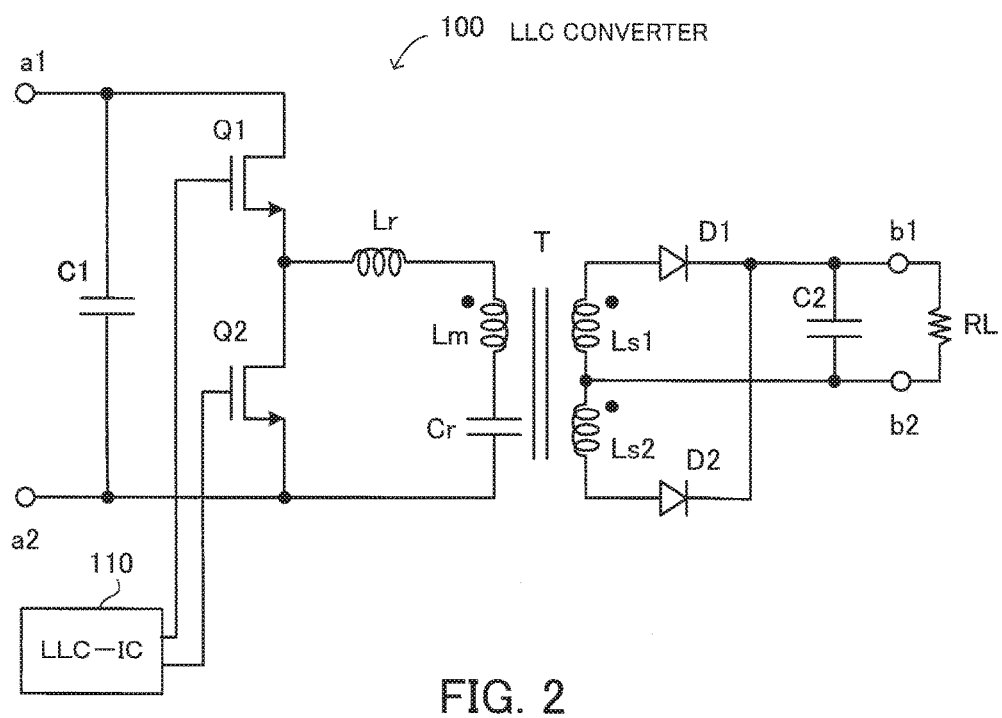
FIG. 2 illustrates an example of the structure of an (conventional) LLC converter.

FIG. 2 illustrates an example of the structure of an LLC converter. An LLC converter 100 includes an input capacitor C1, switching elements Q1 and Q2, a resonance inductor Lr, a transformer T, a resonance capacitor Cr, diodes D1 and D2, an output capacitor C2, a resistor (load resistor) RL, and an LLC-IC 110.

Furthermore, the transformer T includes an excitation inductor Lm of a primary winding and inductors Ls1 and Ls2 of a secondary winding. nMOS transistors are used as the switching elements Q1 and Q2.

With flyback converters used in adapters and the like which operate with a small power of several ten watts, pulse width modulation (PWM) is used for exercising control so as to make an output voltage constant.

The PWM is a control method by which the pulse width (duty) of a switching signal is changed so as to make an output voltage Vout constant.

On the other hand, the above LLC converter 100 is a type of series resonance circuit and pulse frequency modulation (PFM) is used for exercising control so as to make an output voltage constant. The PFM is a control method by which the frequency of a switching signal (switching frequency) is changed so as to make an output voltage Vout constant (duty of the switching signal is 50% and is constant).

Furthermore, an input voltage range of the LLC converter 100 is narrow compared with a flyback converter. Therefore, usually a power factor correction (PFC) circuit is disposed in front of the LLC converter 100. The LLC converter 100 is used at an input voltage of, for example, about 390 V.

With the LLC converter 100 an output voltage is controlled by changing a frequency by the use of LC resonance. On the basis of this operating principle, the analysis technique of first harmonic approximation (FHA) is applied to power supply design.

Figure 3:
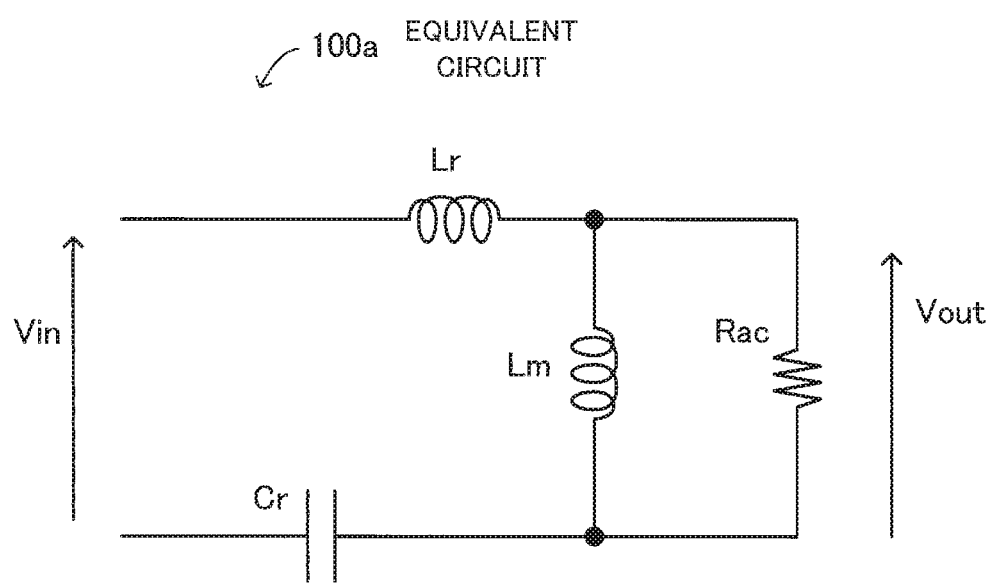
FIG. 3 illustrates an equivalent circuit for analyzing the LLC converter.

FIG. 3 illustrates an equivalent circuit for analyzing the LLC converter. An equivalent circuit 100*a* for making a FHA analysis of the LLC converter 100 is illustrated. For the sake of the simplicity of analysis the L, C, and R parts are converted to the primary side. The load resistor RL is equivalent to a resistor Rac.

It is assumed that an input voltage is Vin and that an output voltage is Vout. Then the input-output voltage conversion rate (gain) of the equivalent circuit 100*a* is Vout/Vin and is calculated by the following equation (1)

$$\frac{Vout}{Vin} = \frac{1}{\sqrt{\left[1 + \frac{1}{S} - \frac{1}{S \cdot F^2}\right]^2 + Q^2\left[F - \frac{1}{F}\right]^2}} \quad (1)$$

Furthermore, definition equations of parameters are as follows:

$$S = Lm/Lr \quad (2a)$$

$$fr = \frac{1}{2\pi\sqrt{Lr \cdot Cr}} \quad (2b)$$

$$F = f/fr \quad (2c)$$

$$Zr = \sqrt{\frac{Lr}{Cr}} \quad (2d)$$

$$N = Np/Ns \quad (2e)$$

$$Rac = 8 \cdot N^2 \cdot RL/n^2 \quad (2f)$$

$$Q = Zr/Rac \quad (2g)$$

In the above equations, Lm is excitation inductance, Lr is leakage inductance, Cr is electrostatic capacity, f is an operating frequency (switching frequency), Np is the number of turns of the excitation inductor, Ns is the number of turns of the inductors Ls1 and Ls2, and RL is a resistance value of the resistor Rac.

Figure 4:
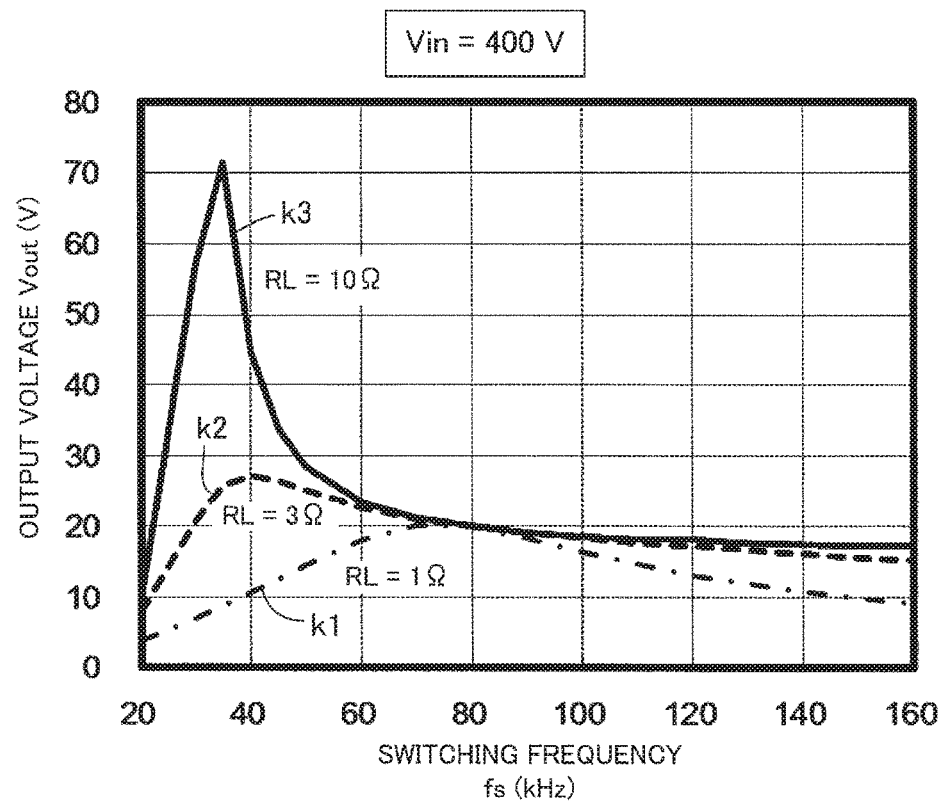
FIG. 4 illustrates the control characteristic of the LLC converter (which depends on a load)

The control characteristic of the LLC converter 100 found by properly substituting concrete parameter values into a FHA analysis equation given by the above equation (1) will now be described. FIG. 4 illustrates the control characteristic of the LLC converter. In FIG. 4, a vertical axis indicates an output voltage Vout (V) and a horizontal axis indicates a switching frequency fs (kHz).

When an input voltage Vin is constant (400 V) and the resistance value of the load resistor RL is changed, the dependence of the output voltage Vout on the switching frequency fs is calculated. A graph k1 indicates a case where RL=1Ω, a graph k2 indicates a case where RL=3Ω, and a graph k3 indicates a case where RL=10Ω.

The values of the parameters in the FHA analysis equation (1) are Lm=1 mH, Lr=200 μH, Cr=20 nF, Np=10, and Ns=1.

An operation use band of the LLC converter 100 is a range from a low-frequency resonance frequency to a high-frequency resonance frequency. A low-frequency resonance frequency fr1 and a high-frequency resonance frequency fr2 are given by the following equations:

$$fr1 = \frac{1}{2\pi\sqrt{(Lm + Lr)Cr}} \quad (3a)$$

$$fr2 = \frac{1}{2\pi\sqrt{Lr \cdot Cr}} \quad (3b)$$

Therefore, the operation use region is about 35 to 80 kHz in FIG. 4.

Figure 5:
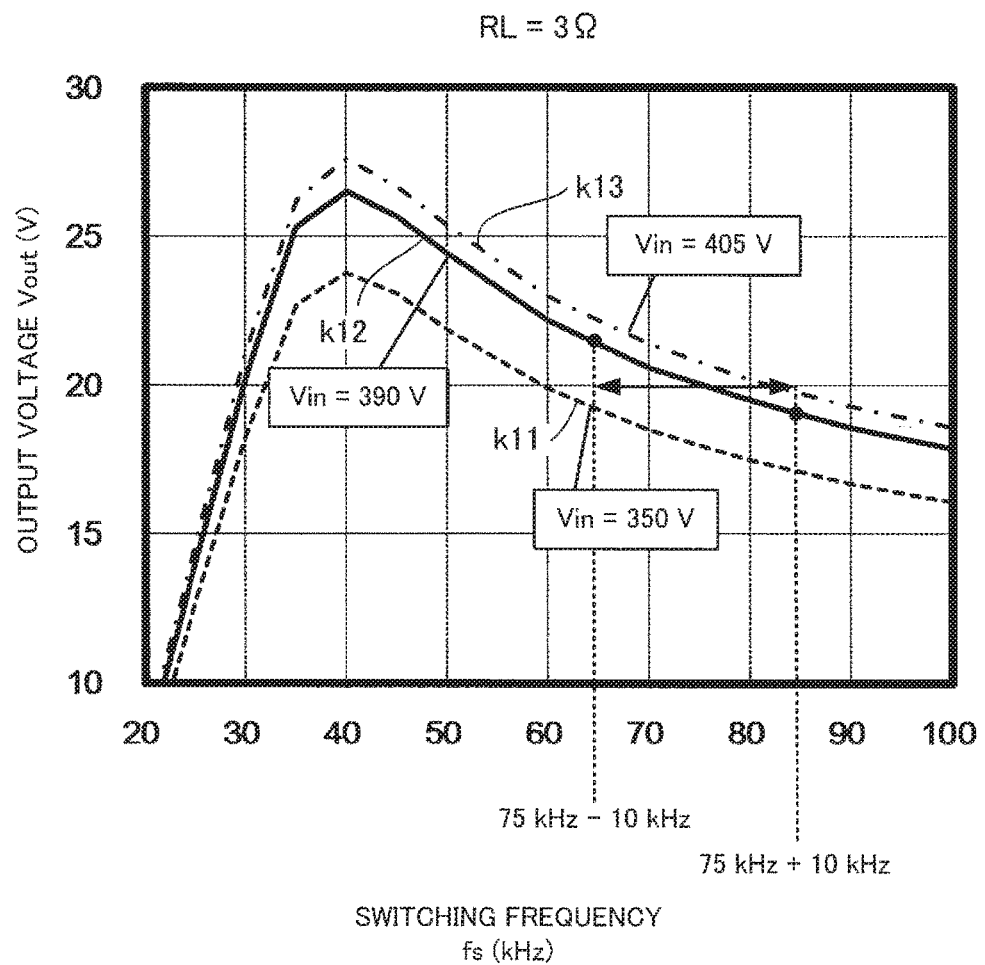
FIG. 5 illustrates the control characteristic of the LLC converter (which depends on an input voltage)

FIG. 5 illustrates the control characteristic of the LLC converter. In FIG. 5, a vertical axis indicates an output voltage Vout (V) and a horizontal axis indicates a switching frequency fs (kHz).

When the resistance value of the load resistor RL is constant (3Ω) and an input voltage Vin is changed, the dependence of the output voltage Vout on the switching frequency fs is calculated. A graph k11 indicates a case where Vin=350 V, a graph k12 indicates a case where Vin=390 V, and a graph k13 indicates a case where Vin=405 V. The values of the parameters in the FHA analysis equation (1) are the same as those of the parameters in the FHA analysis equation (1) in FIG. 4.

In FIG. 5, with the graph k11 Vin_typ=350 V and fs≈60 kHz at an operating point where Vout=20 V. Furthermore, with the graph k12 Vin_typ=390 V and fs≈75 kHz at an operating point where Vout=20 V. With the graph k13 Vin_typ=405 V and fs≈80 kHz at an operating point where Vout=20 V.

The FHA analysis is performed in the above way by the use of equation (1). By doing so, the operation use region of the LLC converter 100, an operating point (input voltage and a switching frequency, for example) which meets an output voltage, or the like is confirmed.

With the LLC converter 100 it is known that noise (EMI noise in particular) is remarkably generated in a low frequency region (band from a first-order harmonic to a several-order harmonic, that is to say, a band from several ten kilohertz to several hundred kilohertz). A filter is located as a usual anti-noise measure to eliminate noise. With this anti-noise measure, however, the number of filters and size increase. This impedes miniaturization of a power supply.

Furthermore, frequency diffusion in which a switching frequency is modulated may be applied to take an anti-noise measure. However, if a switching frequency is simply modulated to perform frequency diffusion, then a change in output voltage becomes greater according to the diffusion of a switching frequency.

In FIG. 5, for example, if a frequency diffusion function is applied at the time of Vin=390 V indicated by the graph k12, then switching frequencies in the range of 75 kHz±10 kHz correspond to Vout=19 to 22 V. That is to say, there is a great change in output voltage.

On the other hand, a regulated value is to be set for EMI noise at frequencies lower than and equal to 150 kHz in new EMI standards. An effective anti-noise measure against EMI noise at frequencies lower than and equal to 150 kHz is desired earnestly. The present invention was made in view of these problems. There is provided a switching power supply apparatus which reduces noise with high accuracy while suppressing an increase in the number of filters and size and a change in output voltage.

Figure 6:
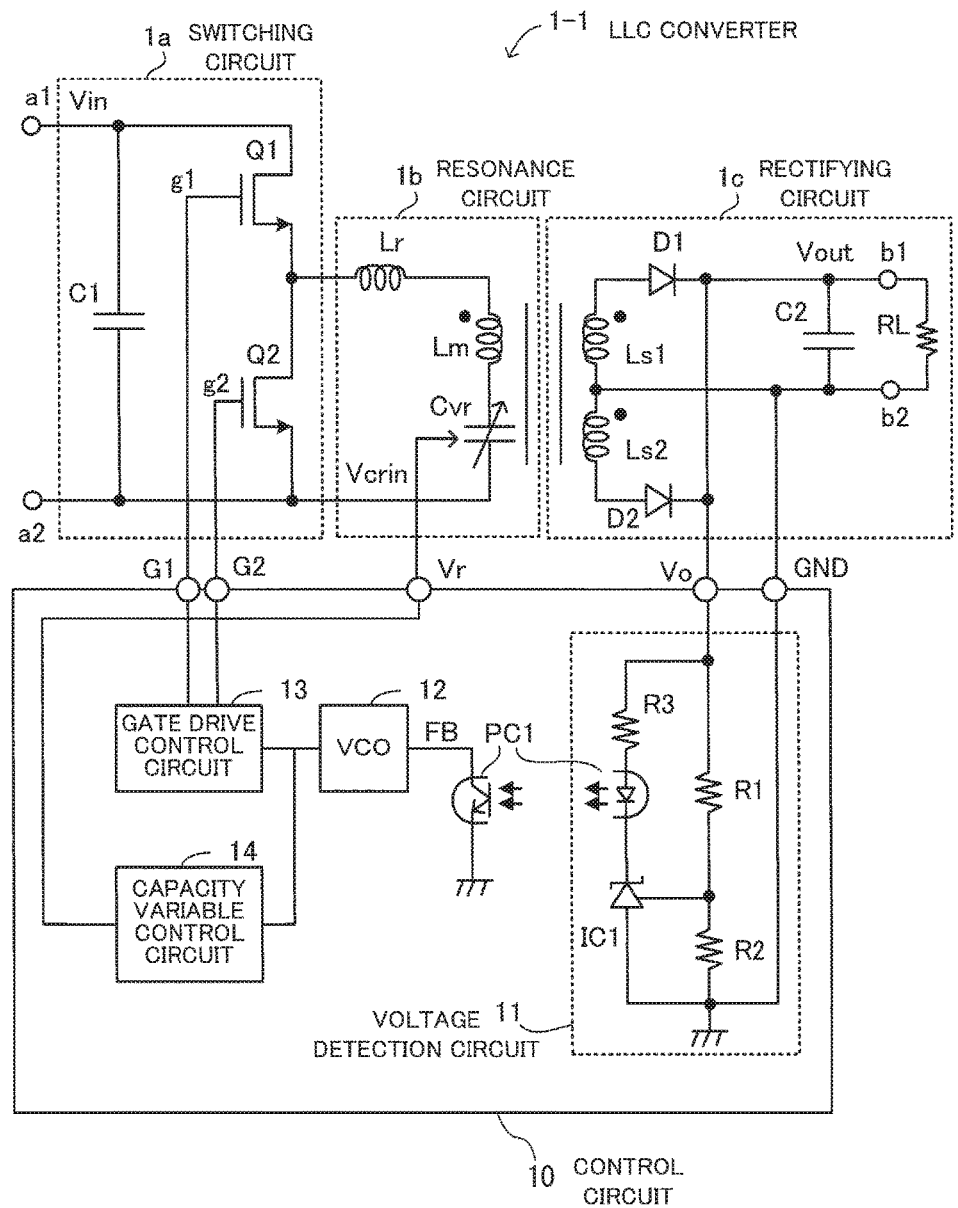
FIG. 6 illustrates an example of the structure of an LLC converter according to a first embodiment.

An LLC converter to which the switching power supply apparatus 1 in the present disclosure is applied will now be described in detail. FIG. 6 illustrates an example of the structure of an LLC converter according to a first embodiment. An LLC converter 1-1 includes a switching circuit 1a, a resonance circuit 1b, a rectifying circuit 1c, and a control circuit 10.

The switching circuit 1a includes an input capacitor C1 and switching elements (nMOS transistors) Q1 and Q2. The resonance circuit 1b includes a resonance inductor Lr, an excitation inductor Lm of a primary winding of a transformer T, and a variable resonance capacitor Cvr. The rectifying circuit 1c includes inductors Ls1 and Ls2 of a secondary winding of the transformer T, rectifier diodes D1 and D2, an output capacitor C2, and a load resistor RL. Leakage inductance of the transformer T may be utilized as the resonance inductor Lr.

The control circuit 10 includes a voltage detection circuit 11, photocouplers PC1, a voltage-controlled oscillator (VCO) 12, a gate drive control circuit 13, a capacity variable control circuit 14. Furthermore, the voltage detection circuit 11 includes resistors R1 through R3, a photodiode of the photocoupler PC1, and a shunt regulator IC1.

The circuit elements are connected in the following way. One end of the input capacitor C1 is connected to an input terminal a1 and a drain of the switching element Q1. A source of the switching element Q1 is connected to one end of the resonance inductor Lr and a drain of the switching element Q2.

A gate of the switching element Q1 is connected to a gate drive terminal G1 of the control circuit 10 and a gate of the switching element Q2 is connected to a gate drive terminal G2 of the control circuit 10.

The other end of the resonance inductor Lr is connected to one end of the excitation inductor Lm and the other end of the excitation inductor Lm is connected to one end of the variable resonance capacitor Cvr. The other end of the input capacitor C1 is connected to an input terminal a2, a source of the switching element Q2, and the other end of the variable resonance capacitor Cvr. A control voltage input terminal of the variable resonance capacitor Cvr is connected to a control voltage output terminal Vr of the control circuit 10.

One end of the inductor Ls1 is connected to an anode of the diode D1. A cathode of the diode D1 is connected to one end of the output capacitor C2, an output terminal b1, a cathode of the diode D2, and an output voltage detection terminal Vo of the control circuit 10.

One end of the inductor Ls2 is connected to an anode of the diode D2. The other end of the inductor Ls1 is connected to the other end of the inductor Ls2, a ground terminal GND of the control circuit 10, the other end of the output capacitor C2, and an output terminal b2. One end of the load resistor RL is connected to the output terminal b1 and the other end of the load resistor RL is connected to the output terminal b2.

One end of the resistor R1 is connected to the output voltage detection terminal Vo and one end of the resistor R3. The other end of the resistor R3 is connected to an anode of the photodiode of the photocoupler PC1. A cathode of the photodiode is connected to a cathode of the shunt regulator IC1.

The other end of the resistor R1 is connected to a reference terminal of the shunt regulator IC1 and one end of the resistor R2. The other end of the resistor R2 is connected to an anode of the shunt regulator IC1 and the ground terminal GND. The ground terminal GND is connected to ground (GND).

An emitter of a phototransistor of the photocoupler PC1 is connected to GND. A collector of the phototransistor is connected to an input end of the VCO 12. An output end of the VCO 12 is connected to an input end of the gate drive control circuit 13 and an input end of the capacity variable control circuit 14. One output end of the gate drive control circuit 13 is connected to the gate drive terminal G1 and the other output end of the gate drive control circuit 13 is connected to the gate drive terminal G2. An output end of the capacity variable control circuit 14 is connected to the control voltage output terminal Vr.

The operation of the control circuit 10 will be described. The voltage detection circuit 11 amplifies an error between a voltage obtained by dividing a DC output voltage Vout by the resistors R1 and R2 and a reference voltage contained in the shunt regulator IC1 to generate a feedback voltage FB. The feedback voltage FB is insulated by the photocouplers PC1 and is transmitted to the VCO 12.

The VCO 12 outputs an oscillating signal whose frequency is changed according to a level of the feedback voltage FB. The gate drive control circuit 13 receives the oscillating signal outputted from the VCO 12, alternately generates gate pulses which are equal in pulse width with dead time therebetween, and outputs the gate pulses to the gates of the switching elements Q1 and Q2 via the gate drive terminals G1 and G2 respectively.

Control is exercised in the following way so as to make the output voltage Vout constant. When the output voltage Vout exceeds a set voltage, the oscillation frequency of the oscillating signal outputted from the VCO 12 is increased. When the output voltage Vout falls below the set voltage, the frequency of the oscillating signal outputted from the VCO 12 is decreased.

Furthermore, the capacity variable control circuit 14 receives the oscillating signal outputted from the VCO 12, generates a control voltage Vcrin for changing the electrostatic capacity of the variable resonance capacitor Cvr, and outputs the control voltage Vcrin to the variable resonance capacitor Cvr via the control voltage output terminal Vr.

The variable resonance capacitor Cvr is a variable capacitance element whose electrostatic capacity changes according to a level of the control voltage Vcrin. The control circuit 10 simultaneously changes the switching frequencies of the gate pulses to be transmitted to the switching elements Q1 and Q2 and the control voltage Vcrin to be supplied to the variable resonance capacitor Cvr. By doing so, an output voltage determined by the FHA is made constant and noise is reduced by frequency diffusion.

Figure 7:
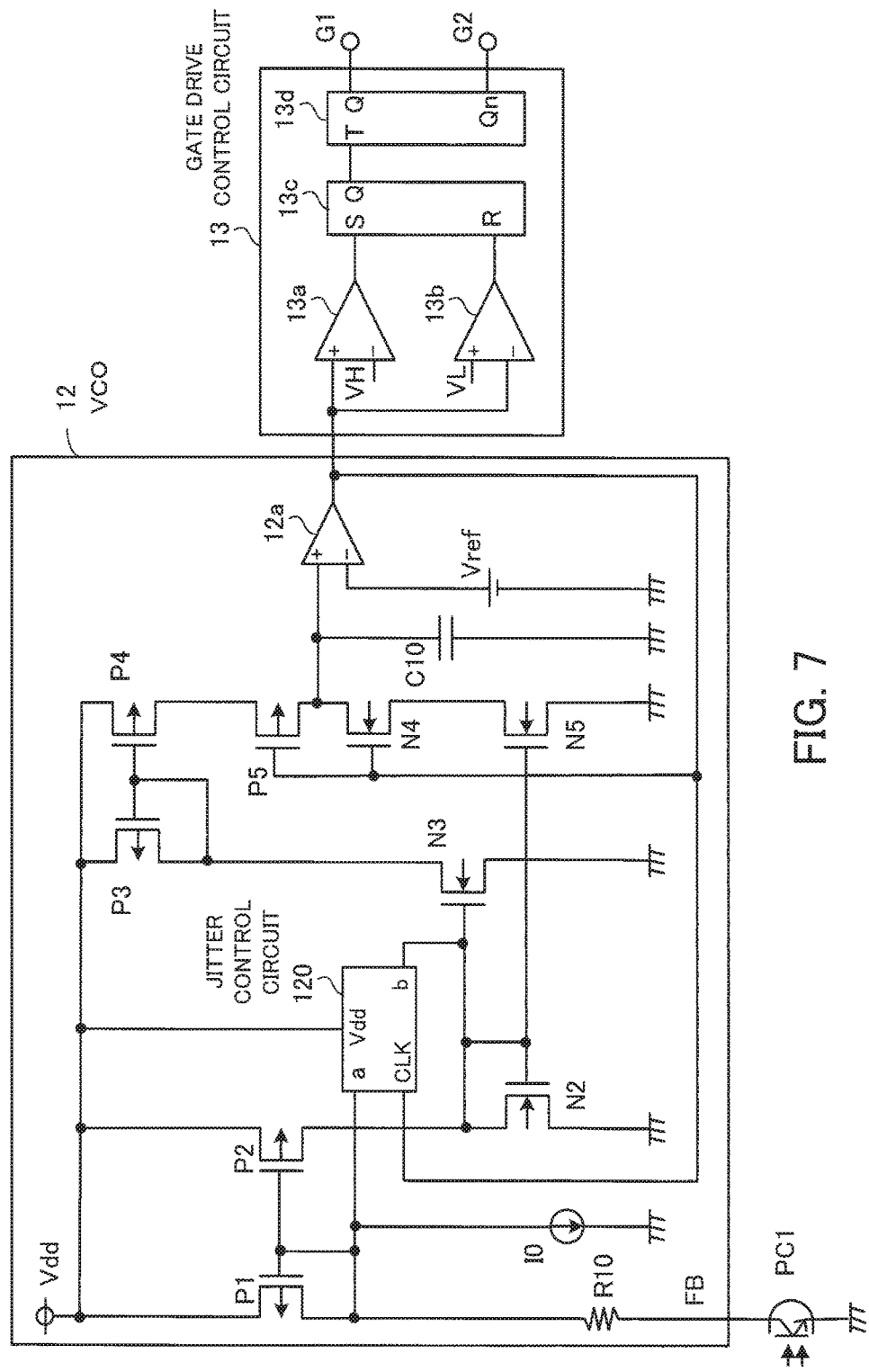
FIG. 7 illustrates an example of the internal structure of each of a VCO and a gate drive control circuit.

The internal structure of the VCO 12 and the gate drive control circuit 13 will now be described. FIG. 7 illustrates an example of the internal structure of each of the VCO and the gate drive control circuit. The VCO 12 includes pMOS transistors P1 through P5, which are p-channel MOSFETs, nMOS transistors N2 through N5, a resistor R10, a current source I0, a capacitor C10, a reference source Vref, a comparator 12a, and a jitter control circuit 120.

The gate drive control circuit 13 includes comparators 13a and 13b, an RS flip-flop 13c, and a T flip-flop 13d.

The circuit elements are connected in the following way. A source of the pMOS transistor P1 is connected to an internal source Vdd, sources of the pMOS transistors P2, P3, and P4, and a source terminal Vdd of the jitter control circuit 120.

A drain of the pMOS transistor P1 is connected to gates of the pMOS transistors P1 and P2, one end of the resistor R10, an input end of the current source I0, and an input terminal a of the jitter control circuit 120. A feedback voltage FB outputted from the photocoupler PC1 is applied to the other end of the resistor R10.

A drain of the pMOS transistor P2 is connected to a drain of the nMOS transistor N2, gates of the nMOS transistors N2, N3, and N5, and an output terminal b of the jitter control circuit 120.

A drain of the pMOS transistor P3 is connected to gates of the pMOS transistors P3 and P4 and a drain of the nMOS transistor N3. A drain of the pMOS transistor P4 is connected to a source of the pMOS transistor P5. A drain of the pMOS transistor P5 is connected to a drain of the nMOS transistor N4, one end of the capacitor C10, and a positive side input terminal (+) of the comparator 12a. A source of the nMOS transistor N4 is connected to a drain of the nMOS transistor N5.

A negative side input terminal (−) of the comparator 12a is connected to a positive side terminal of the reference source Vref. An output end of the current source I0, sources of the nMOS transistors N2, N3, and N5, the other end of the capacitor C10, and a negative side terminal of the reference source Vref are connected to GND.

An output terminal of the comparator 12a is connected to a clock input terminal CLK of the jitter control circuit 120, a gate of the pMOS transistor P5, a gate of the nMOS transistor N4, a positive side input terminal (+) of the comparator 13a, and a negative side input terminal (−) of the comparator 13b.

A reference voltage VH is inputted to a negative side input terminal (−) of the comparator 13a and a reference voltage VL is inputted to a positive side input terminal (+) of the comparator 13b. An output terminal of the comparator 13a is connected to a set terminal S of the RS flip-flop 13c and an output terminal of the comparator 13b is connected to a reset terminal R of the RS flip-flop 13c.

An output terminal Q of the RS flip-flop 13c is connected to an input terminal T of the T flip-flop 13d. An output terminal Q of the T flip-flop 13d is connected to the gate drive terminal G1. An inverting output terminal Qn of the T flip-flop 13d is connected to the gate drive terminal G2.

The operation will be described. The pMOS transistors P1 and P2 make up a current mirror circuit. Therefore, when a feedback voltage FB is applied to the VCO 12, a current flows through the resistor R10. The current which flows through the resistor R10 is a first input current of the current mirror circuit.

Furthermore, because the current source 10 is connected between a drain terminal of the pMOS transistor P1 and GND, a current of the current source 10 is a second input current of the current mirror circuit.

An output current of the current mirror circuit is supplied to the nMOS transistor N2 connected to a drain terminal of the pMOS transistor P2, which is an output terminal of the current mirror circuit, and is used for controlling a current flowing through the nMOS transistor N5. In addition, the output current of the current mirror circuit is used for controlling via the nMOS transistor N3 and the pMOS transistor P3 a current flowing through the pMOS transistor P4.

The pMOS transistor P4 and the nMOS transistor N5 are connected in series with the pMOS transistor P5 and the nMOS transistor N4 complementarily on-off controlled therebetween. The capacitor C10 is connected at an intermediate connection point between the pMOS transistor P5 and the nMOS transistor N4 connected in series.

The pMOS transistor P5 charges the capacitor C10 at the time of being in an on state with a current flowing through the pMOS transistor P4. Furthermore, the nMOS transistor N4 discharges the capacitor C10 at the time of being in an on state with a current flowing through the nMOS transistor N5.

The nMOS transistors N2, N3, and N5 make up a current mirror circuit and the pMOS transistors P3 and P4 make up a current mirror circuit.

The comparator 12a is a hysteresis comparator and compares a charging voltage and a discharging voltage of the capacitor C10 and a determined voltage of the reference source Vref. Because the comparator 12a has a hysteresis characteristic, there are actually two reference voltages as a voltage of the reference source Vref compared with a charging voltage and a discharging voltage of the capacitor C10: an H-side reference voltage and an L-side reference voltage.

On the basis of the result of a comparison between the charging and discharging voltages of the capacitor C10 and the determined voltage of the reference source Vref, the comparator 12a generates a drive signal for turning on and off the switching elements Q1 and Q2.

An output of the comparator 12a is also used as a gate drive signal for complementarily on-off controlling the pMOS transistor P5 and the nMOS transistor N4 and as a clock signal for specifying the operation of the jitter control circuit 120. Pulses which are at H and L levels for the same time are alternately outputted from the output terminal Q and inverting output terminal Qn of the T flip-flop 13d.

Figure 8:
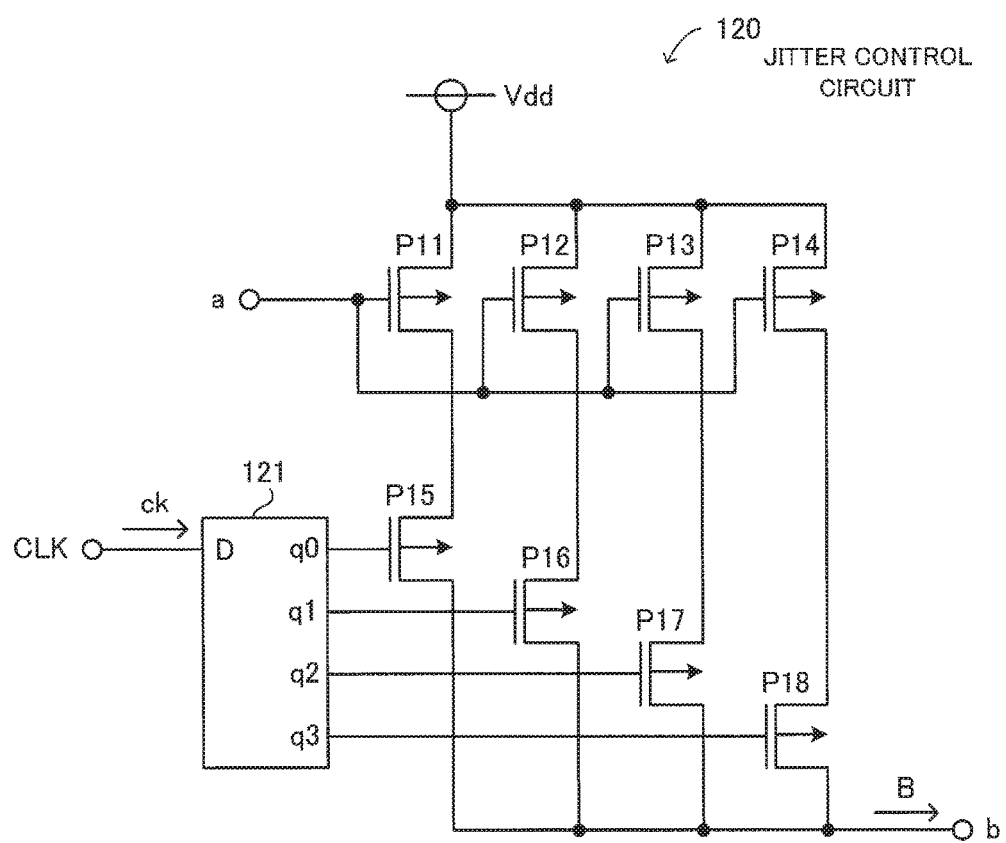
FIG. 8 illustrates an example of the internal structure of a jitter control circuit.

FIG. 8 illustrates an example of the internal structure of the jitter control circuit. The jitter control circuit 120 (in the case of 4 bits) includes pMOS transistors P11 through P18 and a counter 121.

The circuit elements are connected in the following way. A source of the pMOS transistor P11 is connected to an internal source Vdd and sources of the pMOS transistors P12 through P14. A gate of the pMOS transistor P11 is connected to an input terminal a and gates of the pMOS transistors P12 through P14.

A drain of the pMOS transistor P11 is connected to a source of the pMOS transistor P15. A drain of the pMOS transistor P12 is connected to a source of the pMOS transistor P16.

A drain of the pMOS transistor P13 is connected to a source of the pMOS transistor P17. A drain of the pMOS transistor P14 is connected to a source of the pMOS transistor P18.

An input terminal D of the counter 121 is connected to a clock input terminal CLK. Output terminals q0 through q3 of the counter 121 are connected to gates of the pMOS transistors P15 through P18 respectively. Drains of the pMOS transistors P15 through P18 are connected to an output terminal b.

Each of the plural (four) pMOS transistors P11, P12, P13, and P14 included in the jitter control circuit 120 and the pMOS transistor P1 make up a current mirror circuit.

The pMOS transistors P15 through P18 are connected in series with the pMOS transistors P11 through P14 respectively. Furthermore, the pMOS transistors P15 through P18 receive outputs q0 through q3, respectively, of the counter 121, are on-off controlled, selectively output currents flowing through the pMOS transistors P11 through P14 respectively, and add them to a drain current of the nMOS transistor N2.

For example, currents flowing through the pMOS transistors P11 through P14 are set to I1, I2 (=2·I1), I3 (=2·I2=4·I1), and I4 (=2·I3=4·I2=8·I1) respectively. These current ratios are set by changing the gate widths (gate lengths) of the pMOS transistors P11 through P14. Each of the pMOS transistors P11, P12, P13, and P14 and the pMOS transistor P1 make up a current mirror circuit.

The counter 121 frequency-divides an output ck of the comparator 12a and performs counting operation. The counter 121 counts the number of input clock signals and changes outputs q0 through q3 in order in the range of, for example, (0000) to (1111) represented by binary numbers.

By doing so, the pMOS transistors P15 through P18 are selectively on-off controlled. By selectively turning on the pMOS transistors P15 through P18, currents flowing through the pMOS transistors P11 through P14 are selectively outputted. As a result, an output current B of the jitter control circuit 120 flowing to the output terminal b changes stepwise.

Because the counter 121 outputs 4 bits, an output of the counter 121 has 16 stages. The output current B is supplied to the nMOS transistor N2 in the VCO 12. In addition, a current with which the capacitor C10 is charged is changed stepwise and time taken to charge the capacitor C10 to the voltage of the reference source Vref is changed cyclically.

As a result, a cyclical jitter (fluctuation) having a constant width is given to the frequency of a pulse signal outputted via the comparator 12a. Such control of an oscillation frequency is frequency diffusion control (jitter control) of a switching frequency by which the switching elements Q1 and Q2 are driven. By exercising the jitter control, noise (EMI noise) generated by the switching of the switching elements Q1 and Q2 is frequency-diffused and therefore the noise is reduced.

Figure 9:
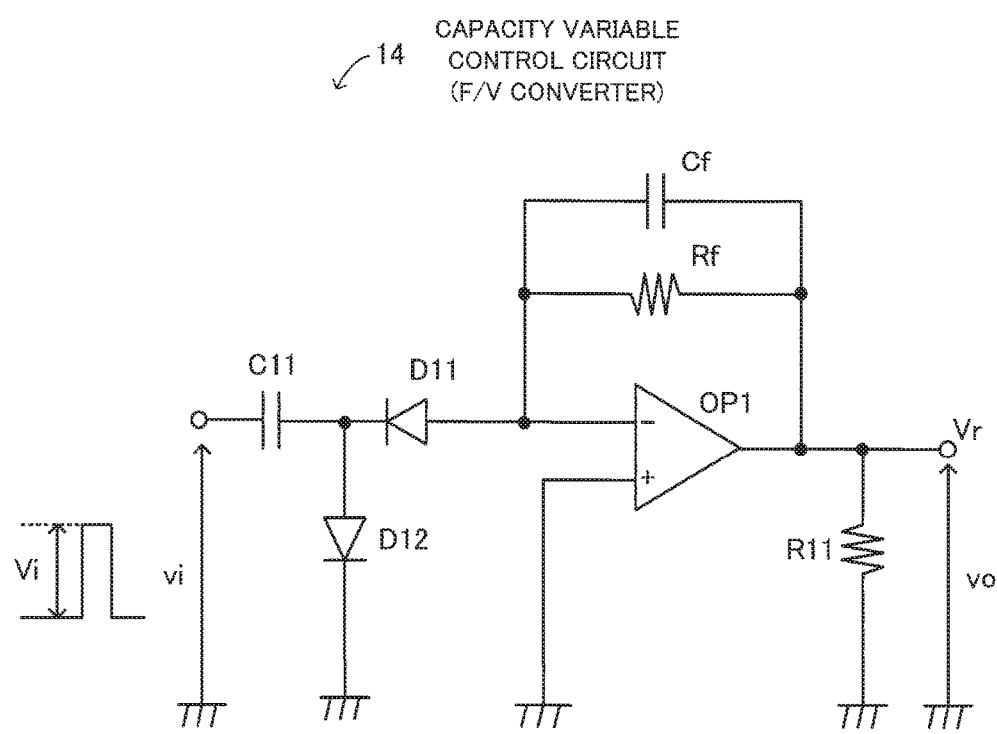
FIG. 9 illustrates an example of the structure of a capacity variable control circuit.

The structure of the capacity variable control circuit 14 will now be described. FIG. 9 illustrates an example of the structure of a capacity variable control circuit. The capacity variable control circuit 14 is a frequency-to-voltage conversion circuit (F/V converter) and includes a capacitor C11 (first capacitor), a capacitor Cf (second capacitor), a diode D11 (first diode), a diode D12 (second diode), a resistor Rf (first resistor), a resistor R11 (second resistor), and an OP amp. OP1.

One end of the capacitor C11 is connected to an input terminal from which an oscillating signal outputted from the VCO 12 is inputted. The other end of the capacitor C11 is connected to a cathode of the diode D11 and an anode of the diode D12.

An anode of the diode D11 is connected to one end of the capacitor Cf, one end of the resistor Rf, and a negative side input terminal (−) of the OP amp. OP1.

An output terminal of the OP amp. OP1 is connected to the other end of the capacitor Cf, the other end of the resistor Rf, one end of the resistor R11, and a control voltage output terminal Vr. A cathode of the diode D12, a positive side input terminal (+) of the OP amp. OP1, and the other end of the resistor R11 are connected to GND.

The operation of the capacity variable control circuit 14 is as follows. When a pulse whose peak value is Vi is inputted, an electric charge Q (=CVi) is stored in the capacitor Cf via the diodes D11 and D12. At this time vo=Q/Cf=(C/Cf)·Vi where vo is an output voltage (control voltage Vcrin). In addition, when a pulse is continuously inputted, the peak of the output voltage vo increases stepwise by (C/Cf)·Vi. That is to say, each time an input vi is provided, the output voltage vo increases stepwise.

The optimization of the frequency diffusion of a switching frequency and the electrostatic capacity of the variable resonance capacitor Cvr will now be described. First the relationship between a control voltage Vcrin and a feedback voltage FB, the relationship between the electrostatic capacity of the variable resonance capacitor Cvr and a feedback voltage FB, the relationship between a switching frequency fs and a feedback voltage FB, and the relationship between the electrostatic capacity of the variable resonance capacitor Cvr and a control voltage Vcrin will be described.

Figure 10:
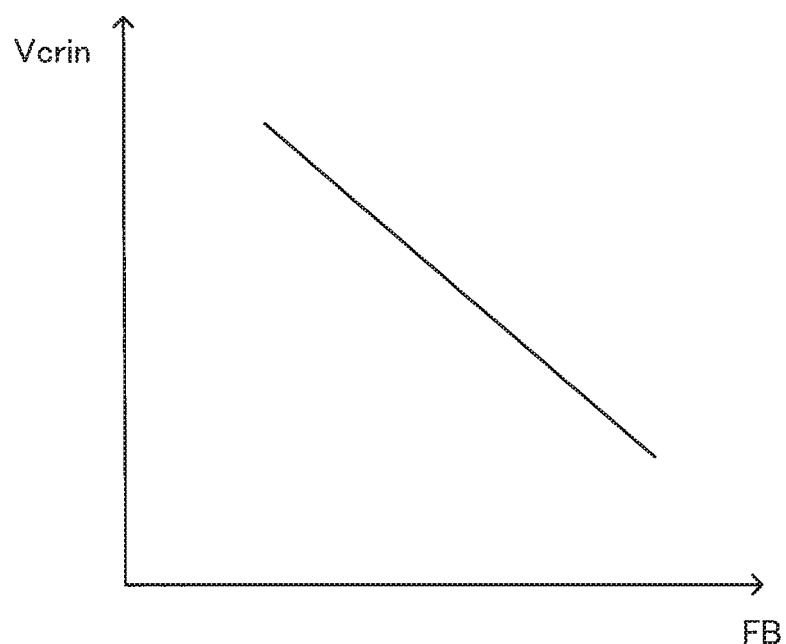
FIG. 10 illustrates the relationship between a control voltage and a feedback voltage.

FIG. 10 illustrates the relationship between a control voltage and a feedback voltage. In FIG. 10, a vertical axis indicates a control voltage Vcrin and a horizontal axis indicates a feedback voltage FB.

The relationship between a control voltage Vcrin for changing the electrostatic capacity of the variable resonance capacitor Cvr and a feedback voltage FB is as follows. As a feedback voltage FB falls, a control voltage Vcrin rises. As a feedback voltage FB rises, a control voltage Vcrin falls.

Figure 11:
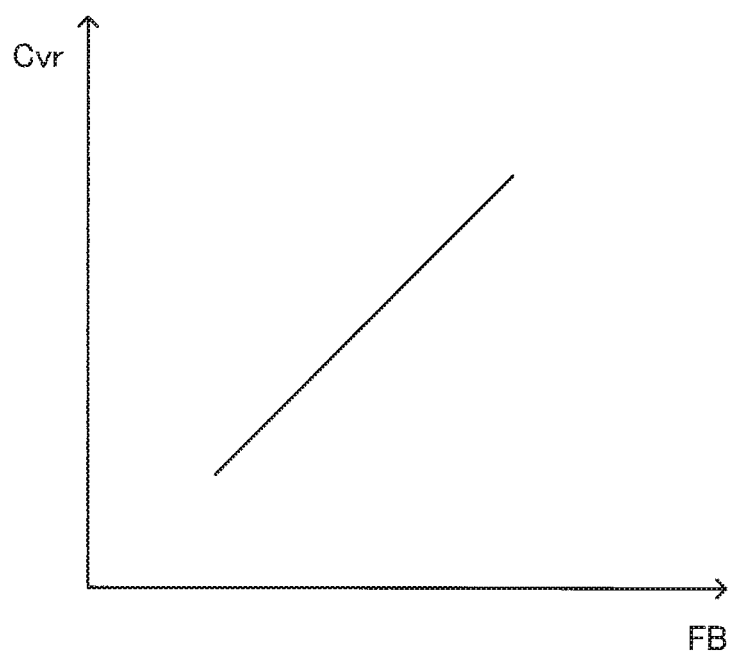
FIG. 11 illustrates the relationship between an electrostatic capacity of a variable resonance capacitor and a feedback voltage.

FIG. 11 illustrates the relationship between an electrostatic capacity of the variable resonance capacitor and a feedback voltage. In FIG. 11, a vertical axis indicates an electrostatic capacity of the variable resonance capacitor Cvr and a horizontal axis indicates a feedback voltage FB. The relationship between an electrostatic capacity of the variable resonance capacitor Cvr and a feedback voltage FB is as follows. As a feedback voltage FB falls, an electrostatic capacity of the variable resonance capacitor Cvr becomes smaller. As a feedback voltage FB rises, an electrostatic capacity of the variable resonance capacitor Cvr becomes larger.

Figure 12:
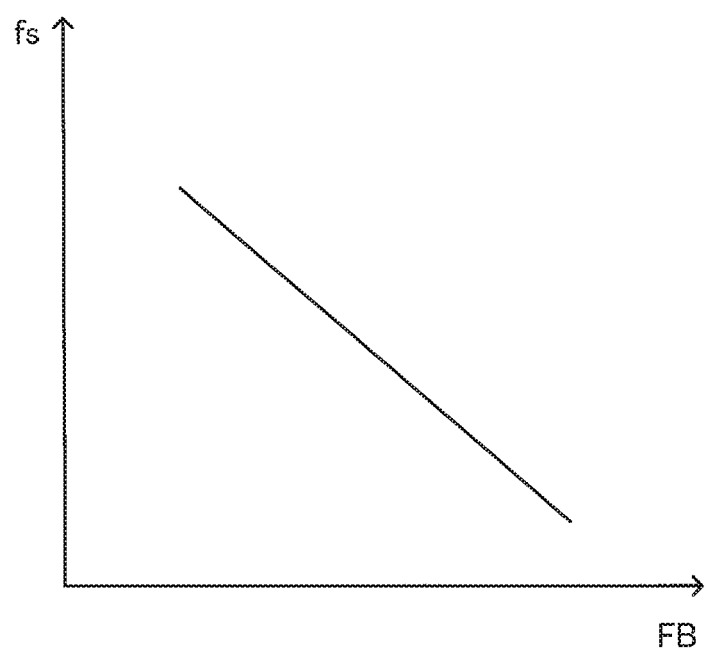
FIG. 12 illustrates the relationship between a switching frequency and a feedback voltage.

FIG. 12 illustrates the relationship between a switching frequency and a feedback voltage. In FIG. 12, a vertical axis indicates a switching frequency fs and a horizontal axis indicates a feedback voltage FB. The relationship between a switching frequency fs and a feedback voltage FB is as follows. As a feedback voltage FB falls, a switching frequency fs becomes higher. As a feedback voltage FB rises, a switching frequency fs becomes lower.

Figure 13:
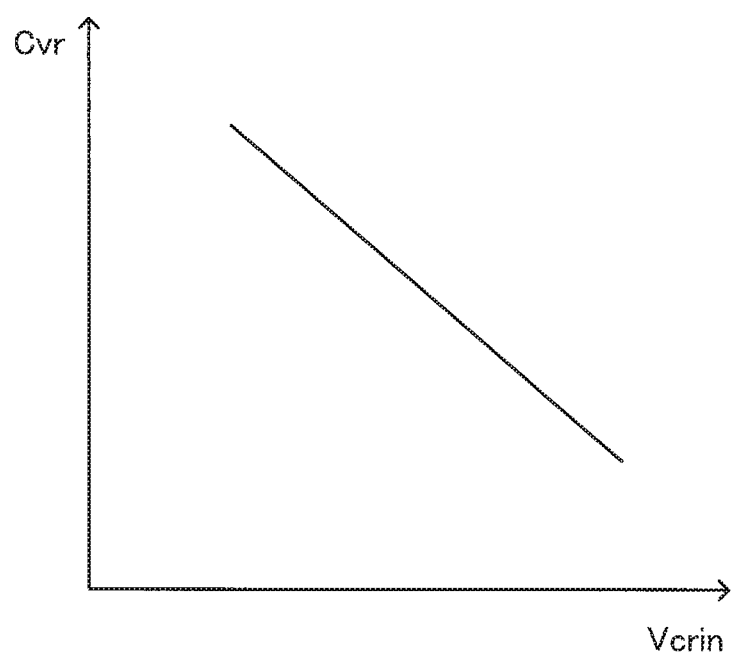
FIG. 13 illustrates the relationship between an electrostatic capacity of the variable resonance capacitor and a control voltage.

FIG. 13 illustrates the relationship between an electrostatic capacity of the variable resonance capacitor and a control voltage. In FIG. 13, a vertical axis indicates an electrostatic capacity of the variable resonance capacitor Cvr and a horizontal axis indicates a control voltage Vcrin. The relationship between an electrostatic capacity of the variable resonance capacitor Cvr and a control voltage Vcrin is as follows. As a control voltage Vcrin falls, an electrostatic capacity of the variable resonance capacitor Cvr becomes larger. As a control voltage Vcrin rises, an electrostatic capacity of the variable resonance capacitor Cvr becomes smaller.

Figure 14:
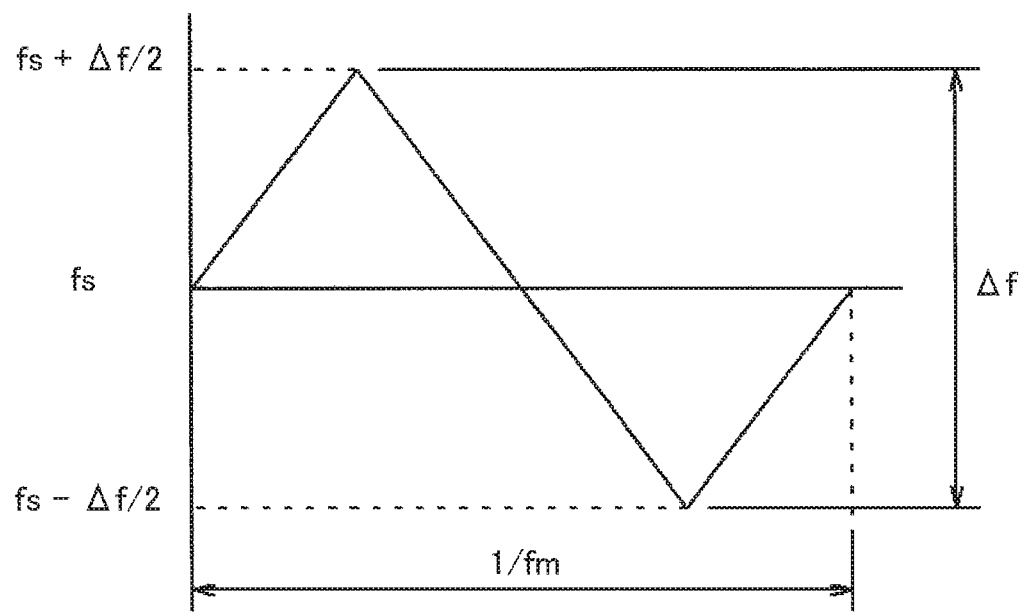
FIG. 14 illustrates a modulation frequency.

A modulation frequency in frequency diffusion will now be described. FIG. 14 illustrates a modulation frequency. In FIG. 14, a vertical axis indicates a switching frequency and a horizontal axis indicates time. Frequency diffusion is performed by modulating a switching frequency fs. The waveform of a modulation frequency fm is indicated in FIG. 14. The upper-limit frequency value of the modulation frequency fm is (fs+Δf/2) and the lower-limit frequency value of the modulation frequency fm is (fs−Δf/2). Δf is the frequency difference (diffusion width) between the upper-limit frequency value and the lower-limit frequency value.

Figure 15:
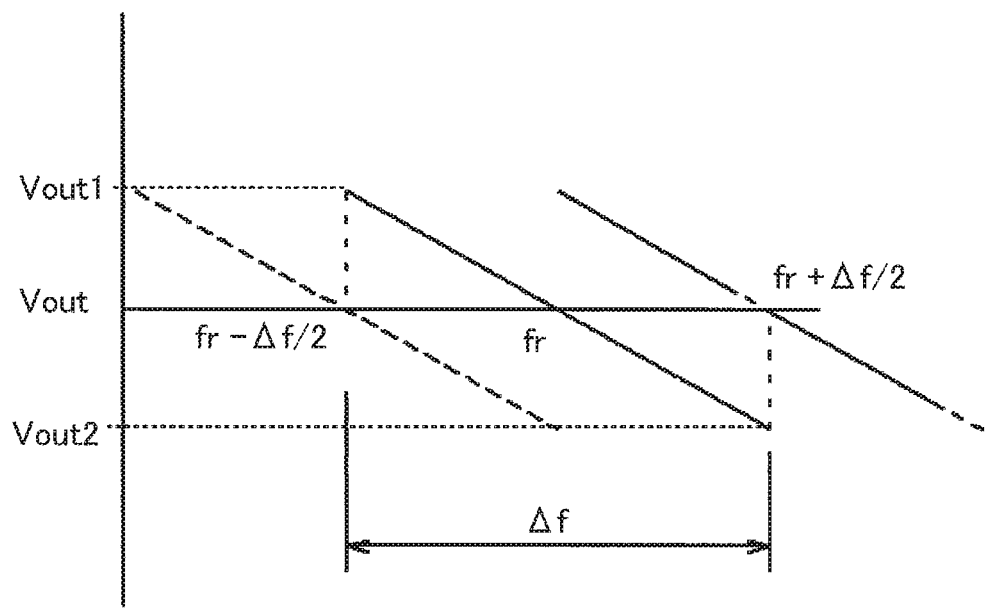
FIG. 15 illustrates the relationship between an output voltage and a resonance frequency.

The relationship between an output voltage of the LLC converter and a resonance frequency and the electrostatic capacity characteristic of the variable resonance capacitor relative to a control voltage will now be described. FIG. 15 illustrates the relationship between an output voltage and a resonance frequency. In FIG. 15, a vertical axis indicates an output voltage and a horizontal axis indicates a resonance frequency. When a resonance frequency is fr, an output voltage is Vout. Furthermore, when a resonance frequency is (fr−Δf/2), an output voltage is Vout1. When a resonance frequency is (fr+Δf/2), an output voltage is Vout2. Δf is the frequency difference between the resonance frequency (fr+Δf/2) and the resonance frequency (fr−Δf/2).

Figure 16:
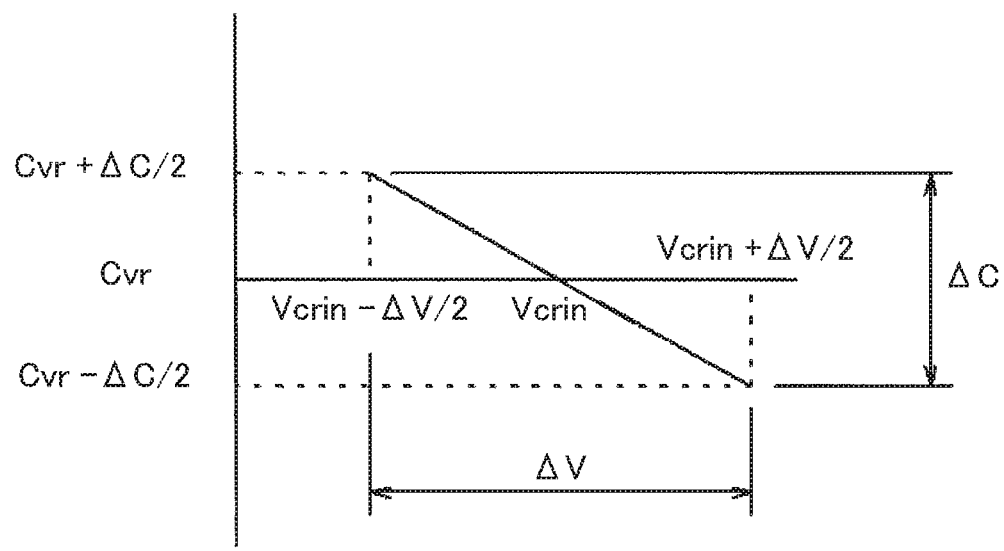
FIG. 16 illustrates the electrostatic capacity characteristic of the variable resonance capacitor relative to a control voltage.

FIG. 16 illustrates the electrostatic capacity characteristic of the variable resonance capacitor relative to a control voltage. In FIG. 16, a vertical axis indicates an electrostatic capacity and a horizontal axis indicates a control voltage. When a control voltage is Vcrin, an electrostatic capacity of the variable resonance capacitor is Cvr. Furthermore, when a control voltage is (Vcrin−ΔV/2), an electrostatic capacity of the variable resonance capacitor is (Cvr+ΔC/2). When a control voltage is (Vcrin+ΔV/2), an electrostatic capacity of the variable resonance capacitor is (Cvr−ΔC/2).

ΔV is the voltage difference between the control voltage (Vcrin+ΔV/2) and the control voltage (Vcrin−ΔV/2). ΔC is the electrostatic capacity difference between the electrostatic capacity (Cvr+ΔC/2) and the electrostatic capacity (Cvr−ΔC/2).

Correspondences between a switching frequency, an electrostatic capacity of the variable resonance capacitor, and a control voltage will now be described. FIG. 17 illustrates correspondences between a switching frequency, an electrostatic capacity of the variable resonance capacitor, and a control voltage.

With a correspondence r1 a switching frequency is the upper-limit switching frequency (fs+Δf/2) when a resonance frequency is the upper-limit resonance frequency (fr+Δf/2). Furthermore, at this time an electrostatic capacity of the variable resonance capacitor is the lower-limit electrostatic capacity (Cvr−ΔC/2) and a control voltage is the upper-limit control voltage (Vcrin+ΔV/2).

With a correspondence r2 a switching frequency is the lower-limit switching frequency (fs−Δf/2) when a resonance frequency is the lower-limit resonance frequency (fr−Δf/2). Furthermore, at this time an electrostatic capacity of the variable resonance capacitor is the upper-limit electrostatic capacity (Cvr+ΔC/2) and a control voltage is the lower-limit control voltage (Vcrin−ΔV/2).

The above correspondences exist between a switching frequency, an electrostatic capacity of the variable resonance capacitor, and a control voltage. A switching frequency, an electrostatic capacity of the variable resonance capacitor, and a control voltage are determined by performing optimization on the basis of these correspondences.

Figure 18:
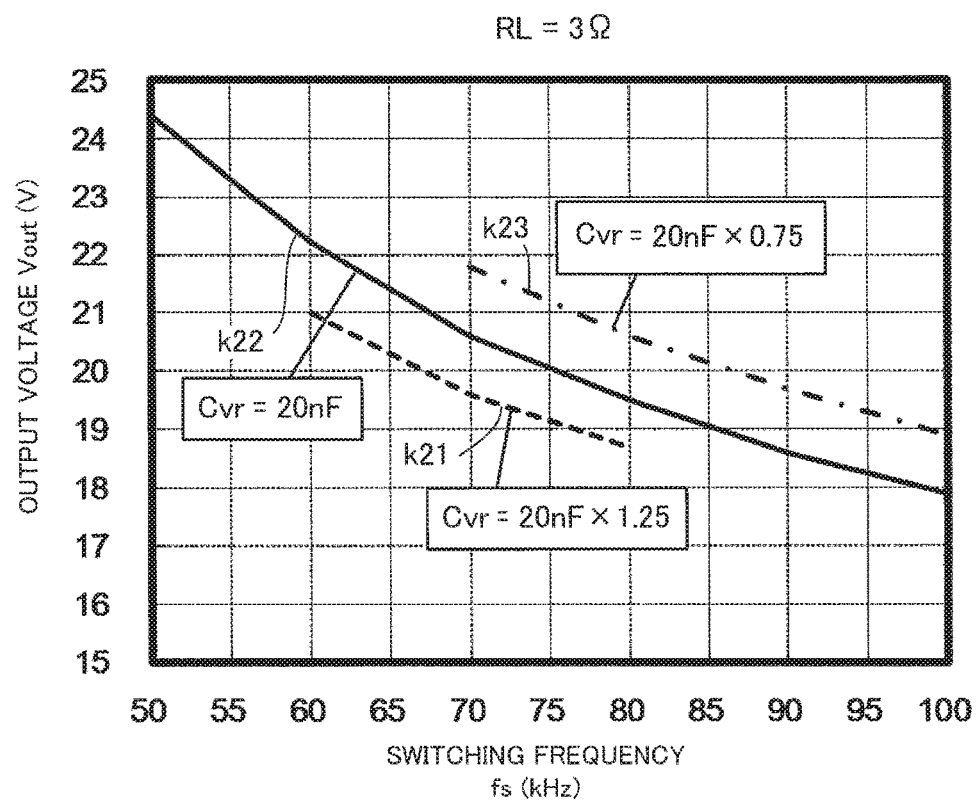
FIG. 18 illustrates the control characteristic of the LLC converter.

The relationship between an output voltage, a switching frequency, and a variable electrostatic capacity will now be described as the control characteristic of the LLC converter. FIG. 18 illustrates the control characteristic of the LLC converter. FIG. 18 illustrates the correspondence between an output voltage and a switching frequency obtained in the case of an electrostatic capacity of the variable resonance capacitor Cvr being set to 20 nF±25%. In FIG. 18, a vertical axis indicates an output voltage Vout (V) and a horizontal axis indicates a switching frequency fs (kHz).

The resistance value RL of the load resistor is set to 3Ω and is constant. The dependence of an output voltage on a switching frequency obtained at the time of changing an electrostatic capacity of the variable resonance capacitor Cvr is calculated. A graph k21 is obtained in the case of Cvr=20 nF×1.25, a graph k22 is obtained in the case of Cvr=20 nF, and a graph k23 is obtained in the case of Cvr=20 nF×0.75.

As can be seen from FIG. 18, control is exercised so that Vout=20 V (constant) at switching frequencies fs in the range of about 67 to 87 kHz (Δf=20 kHz). It is recognized from actual measurement results that even if Δf=10 kHz, low noise performance is sufficiently obtained. Even if an electrostatic capacity of the variable resonance capacitor Cvr is set to about 20 nF±20%, that is to say, the range of electrostatic capacities of the variable resonance capacitor Cvr is narrowed, a noise reduction of 6 dB or more is expected.

The selection of a modulation frequency at the time of performing frequency diffusion will now be described. FIG. 19 illustrates an example of setting a modulation frequency. A table T1 indicates a modulation frequency fm calculated in the case of a switching frequency being set to 65 kHz, 80 kHz, or 100 kHz and a bit number n of the counter in the jitter control circuit being set to 7, 8, 9, or 10.

A modulation frequency fm is calculated by $$fm=fs/2^n$$

where fs is a switching frequency and n is a bit number. For example, if fs=65 kHz and n=7 ($2^7$=128), then fm=508 Hz.

If frequencies at which EMI noise is regulated are lower than and equal to 150 kHz, then resolution bandwidth (RBW) is 200 Hz. Accordingly, if RBW=fm, the greatest noise reduction effect is achieved.

In the table T1, modulated frequencies nearest 200 Hz are 254 Hz, 156 Hz, and 195 Hz. Accordingly, a great noise reduction effect is achieved at these modulated frequencies and these modulated frequencies are the most suitable points. That is to say, a combination of a switching frequency and a bit number is determined so that a modulation frequency will be 254 Hz, 156 Hz, or 195 Hz.

Figure 20:
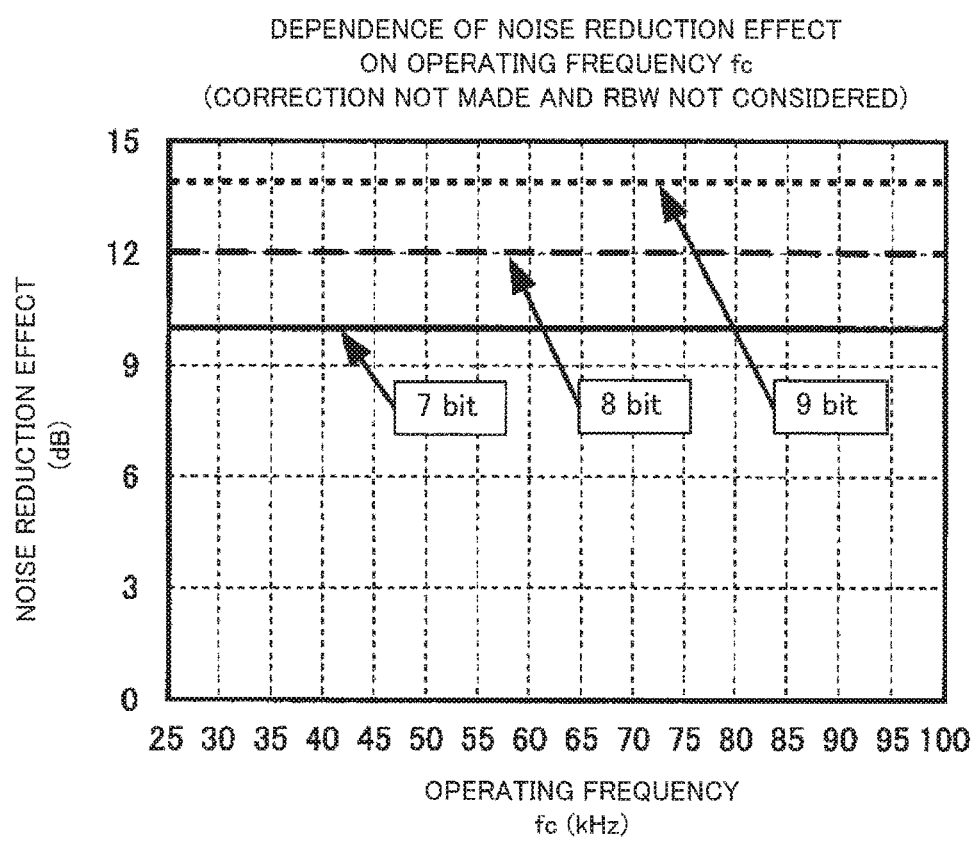
FIG. 20 illustrates the dependence of a noise reduction effect on an operating frequency (not corrected) at the time of expanding the operating frequency to 100 kHz.
Figure 21:
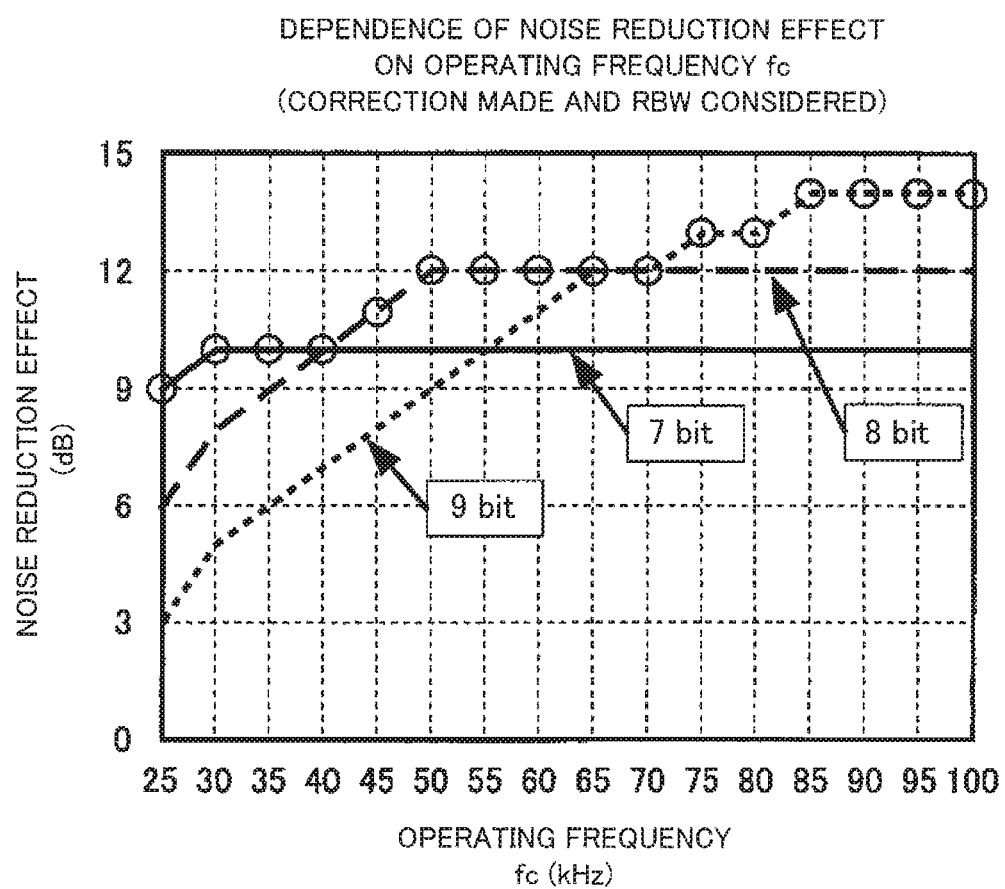
FIG. 21 illustrates the dependence of a noise reduction effect on an operating frequency (corrected) at the time of expanding the operating frequency to 100 kHz.
Figure 22:
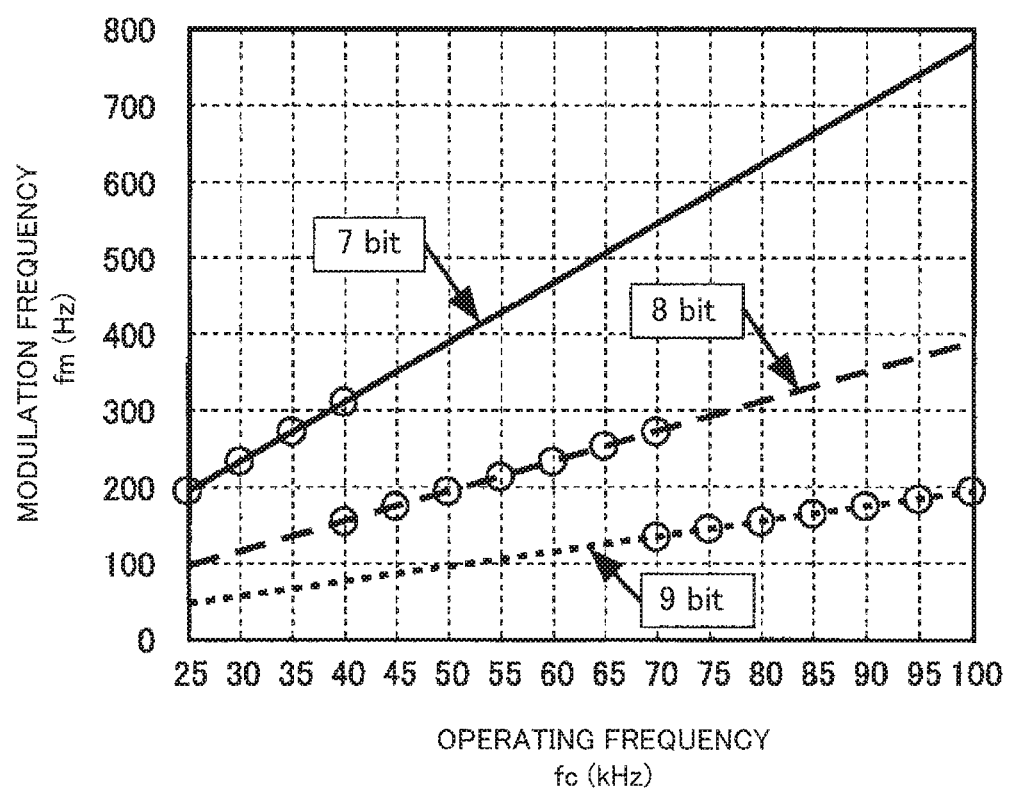
FIG. 22 illustrates the dependence of a modulation frequency on an operating frequency.

An example of the optimization of frequency diffusion will now be described. FIG. 20 illustrates the dependence of a noise reduction effect on an operating frequency (not corrected) at the time of expanding the operating frequency to 100 kHz. FIG. 21 illustrates the dependence of a noise reduction effect on an operating frequency (corrected) at the time of expanding the operating frequency to 100 kHz. FIG. 22 illustrates the dependence of a modulation frequency on an operating frequency.

If operating frequencies fc are 25 to 100 kHz, a noise reduction effect is found from, for example, a calculation equation using a Bessel function. As a result, as illustrated in FIG. 20, a noise reduction of about 10 dB is achieved if a bit number of the counter in the jitter control circuit is 7. A noise reduction of about 12 dB is achieved if a bit number of the counter in the jitter control circuit is 8. A noise reduction of about 14 dB is achieved if a bit number of the counter in the jitter control circuit is 9. That is to say, a certain noise reduction effect is obtained at the operating frequencies fc.

However, graphs indicated in FIG. 20 are obtained in the case of the influence of resolution bandwidth (RBW) not being considered, that is to say, in the case of a correction not being made. If a noise reduction effect is found with the influence of resolution bandwidth (RBW) taken into consideration, that is to say, with a correction made, graphs indicated in FIG. 21 are obtained.

That is to say, if a bit number of the counter in the jitter control circuit is 7, a noise reduction of 9 dB is achieved at an operating frequency fc of 25 kHz. A noise reduction of 10 dB is achieved at operating frequencies fc in the range of 30 to 100 kHz. That is to say, a certain noise reduction effect is obtained.

If a bit number of the counter in the jitter control circuit is 8, a noise reduction of 6-12 dB is achieved at operating frequencies fc in the range of 25 to 50 kHz. A noise reduction of 12 dB is achieved and a noise reduction is constant, at operating frequencies fc in the range of 50 to 100 kHz.

If a bit number of the counter in the jitter control circuit is 9, a noise reduction of 3-12 dB is achieved at operating frequencies fc in the range of 25 to 65 kHz. A noise reduction of 12 dB is achieved and a noise reduction is constant, at operating frequencies fc in the range of 65 to 70 kHz. A noise reduction of 13 dB is achieved and a noise reduction is constant, at operating frequencies fc in the range of 75 to 80 kHz. A noise reduction of 14 dB is achieved and a noise reduction is constant, at operating frequencies fc in the range of 85 to 100 kHz.

As can be seen from FIG. 21, the 7-bit curve and the 8-bit curve cross at an operating frequency fc of 40 kHz and the 8-bit curve and the 9-bit curve cross at operating frequencies fc in the range of 65 to 70 kHz. That is to say, switching between 7 bits and 8 bits is performed at fc=40 kHz and switching between 8 bits and 9 bits is performed at fc=70 kHz. By doing so, a noise reduction effect is optimized in the whole frequency band from 25 kHz to 100 kHz.

Therefore, as indicated in FIG. 22, a modulation frequency fm changes along the 7-bit curve at operating frequencies fc of 25 to 40 kHz, along the 8-bit curve at operating frequencies fc of 40 to 70 kHz, and along the 9-bit curve at operating frequencies fc of 70 to 100 kHz.

With the switching power supply apparatus whose operating frequency fc changes in the range of 25 to 100 kHz, the maximum value of a noise reduction effect changes at two points, that is to say, at operating frequencies fc of 40 and 70 kHz. Therefore, a bit number of the counter in the jitter control circuit is switched at the two points, that is to say, at operating frequencies fc of 40 and 70 kHz.

As has been described, with the switching power supply apparatus 1 in the present disclosure the switching signals g1 and g2 and the control voltage Vcrin are outputted to change switching frequencies of the switching signals g1 and g2 and the electrostatic capacity of the variable resonance capacitor Cvr at the same time.

As a result, noise is reduced in a low-frequency band including a first harmonic (band from several ten kilohertz to several hundred kilohertz). In addition, filters as an anti-noise measure are not needed (or the number of filters as an anti-noise measure is reduced). This makes it possible to reduce noise while suppressing an increase in circuit scale and a change in output voltage.

Furthermore, the switching power supply apparatus 1 in the present disclosure is effective in accommodating a revision of the standards for conducted EMI noise at frequencies lower than and equal to 150 kHz. Moreover, because additional filters are not needed or the number of additional filters is reduced, an increase in the costs of a power supply apparatus is minimized.

Figure 23:
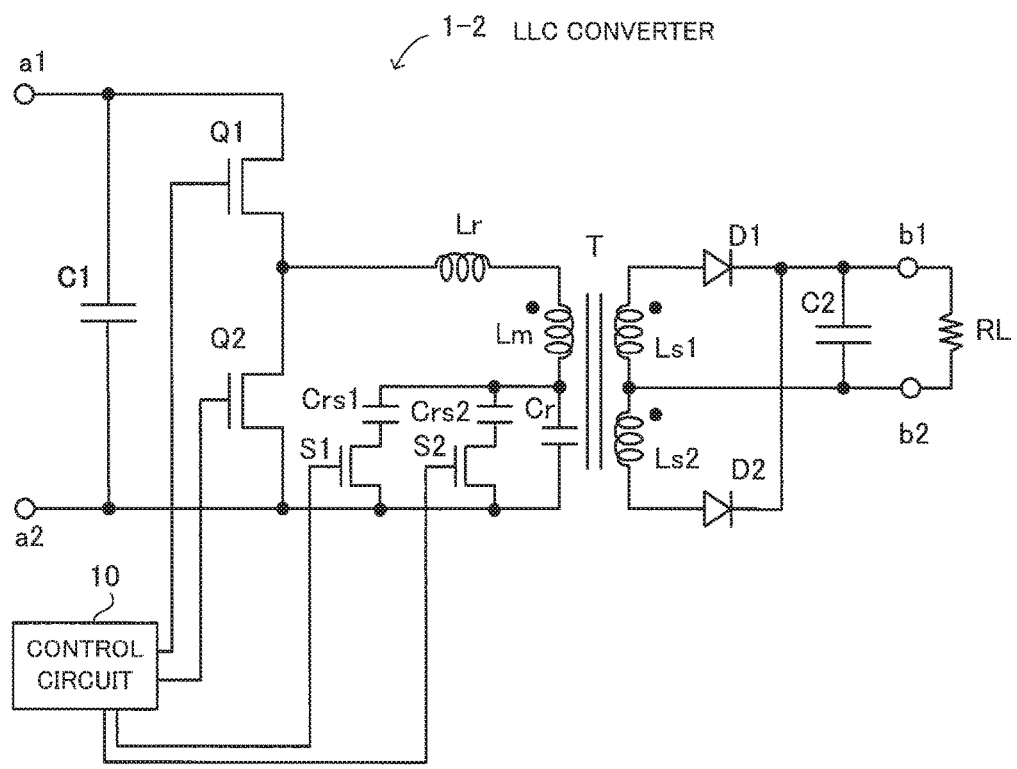
FIG. 23 illustrates an example of the structure of an LLC converter according to a second embodiment.
Figure 24:
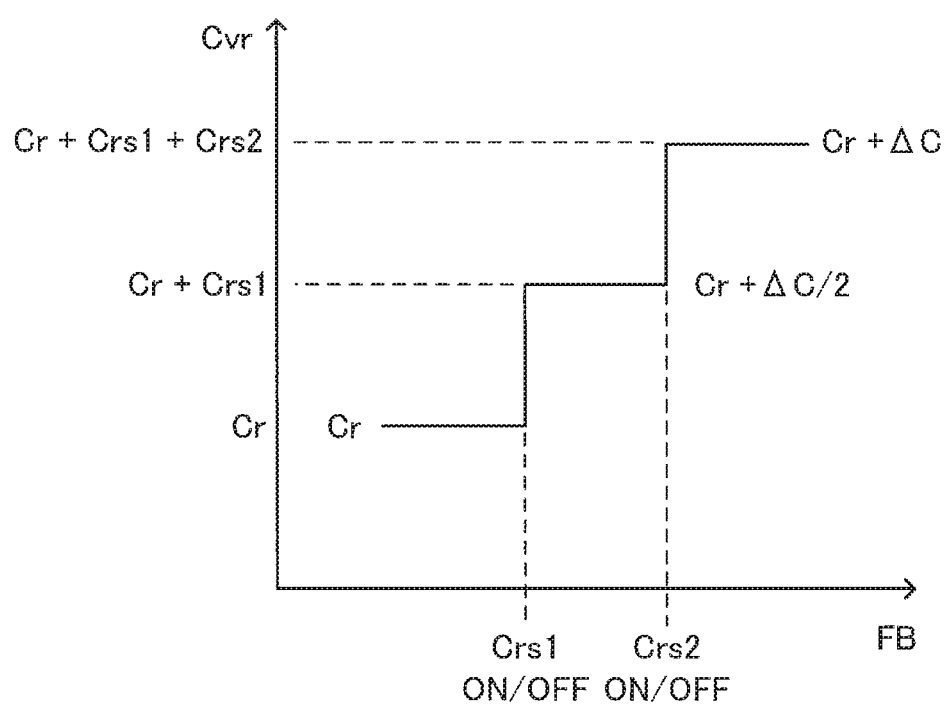
FIG. 24 illustrates the relationship between an electrostatic capacity of a variable resonance capacitor and a feedback voltage.

An LLC converter according to a second embodiment will now be described. FIG. 23 illustrates an example of the structure of an LLC converter according to a second embodiment. FIG. 24 illustrates the relationship between an electrostatic capacity of a variable resonance capacitor and a feedback voltage. In FIG. 24, a vertical axis indicates an electrostatic capacity of a variable resonance capacitor Cvr and a horizontal axis indicates a feedback voltage FB. Components in FIG. 23 which are the same as or equivalent to those illustrated in FIG. 6 are marked with the same numerals and detailed descriptions of them will be omitted. Furthermore, FIG. 24 corresponds to FIG. 11 described in the first embodiment.

With an LLC converter 1-2 according to a second embodiment the structure of the variable resonance capacitor Cvr of the resonance circuit 1b and the capacity variable control circuit 14 in the LLC converter 1-1 according to the first embodiment is changed.

With the LLC converter 1-2 a variable resonance capacitor Cvr includes a resonance capacitor Cr having a fixed electrostatic capacity value, a set of capacity variable capacitors Crs1 and Crs2, and switches S1 and S2 which are nMOS transistors.

A connection point of an excitation inductor Lm and the resonance capacitor Cr is connected to one end of each of the capacity variable capacitors Crs1 and Crs2. The other end of the capacity variable capacitor Crs1 is connected to a drain terminal of the switch S1 and the other end of the capacity variable capacitor Crs2 is connected to a drain terminal of the switch S2. Source terminals of the switches S1 and S2 are connected to an input terminal a2. Gate terminals of the switches S1 and S2 are connected to a capacity variable control circuit 14 of a control circuit 10. It is assumed that the capacity variable capacitors Crs1 and Crs2 have the same electrostatic capacity value.

By adopting the above structure, the capacity variable capacitors Crs1 and Crs2 are selectively connected in parallel with the resonance capacitor Cr by the switches S1 and S2, respectively, and an electrostatic capacity of the variable resonance capacitor Cvr is set to one of three values. That is to say, the three values are an electrostatic capacity Cr of the resonance capacitor Cr alone, an electrostatic capacity (Cr+Crs1) obtained by connecting the resonance capacitor Cr and the capacity variable capacitor Crs1 in parallel, and an electrostatic capacity (Cr+Crs1+Crs2) obtained by connecting the resonance capacitor Cr and the capacity variable capacitors Crs1 and Crs2 in parallel. As a feedback voltage FB falls, an electrostatic capacity value of the variable resonance capacitor Cvr becomes smaller. As a feedback voltage FB rises, an electrostatic capacity value of the variable resonance capacitor Cvr becomes larger. In the first embodiment, an electrostatic capacity of the variable resonance capacitor Cvr changes linearly. Unlike the case of the first embodiment, however, an electrostatic capacity of the variable resonance capacitor Cvr changes stepwise as indicated in FIG. 24.

Figure 25:
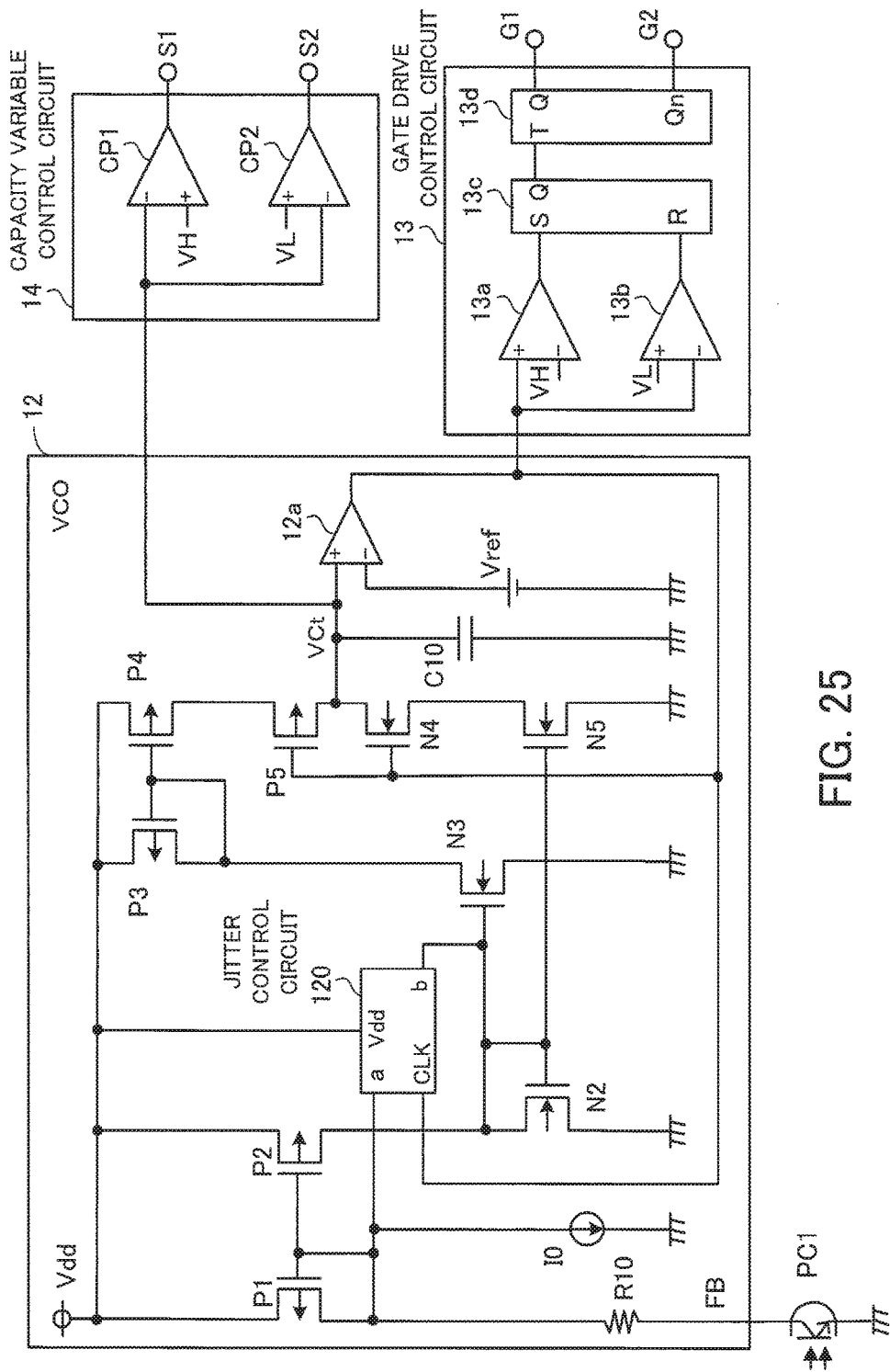
FIG. 25 illustrates an example of the internal structure of each of a VCO and a capacity variable control circuit.

The internal structure of a VCO 12 and the capacity variable control circuit 14 which exercises control so as to connect or disconnect the capacity variable capacitors Crs1 and Crs2 will now be described. FIG. 25 illustrates an example of the internal structure of each of the VCO and the capacity variable control circuit.

The structure of the VCO 12 and a gate drive control circuit 13 is the same as that of the VCO 12 and the gate drive control circuit 13, respectively, in the first embodiment illustrated in FIG. 7. The capacity variable control circuit 14 includes comparators CP1 and CP2.

In the capacity variable control circuit 14, negative side input terminals (−) of the comparators CP1 and CP2 are connected so as receive a voltage Vct of a capacitor C10 included in the VCO 12 for charge and discharge. A reference voltage VH is inputted to a positive side input terminal (+) of the comparator CP1. A reference voltage VL is inputted to a positive side input terminal (+) of the comparator CP2. An output terminal of the comparator CP1 is connected to the gate terminal of the switch S1. An output terminal of the comparator CP2 is connected to the gate terminal of the switch S2. The values of the reference voltages VH and VL inputted to the comparators CP1 and CP2 are the same as those of reference voltages VH and VL, respectively, used in the gate drive control circuit 13.

Figure 27:
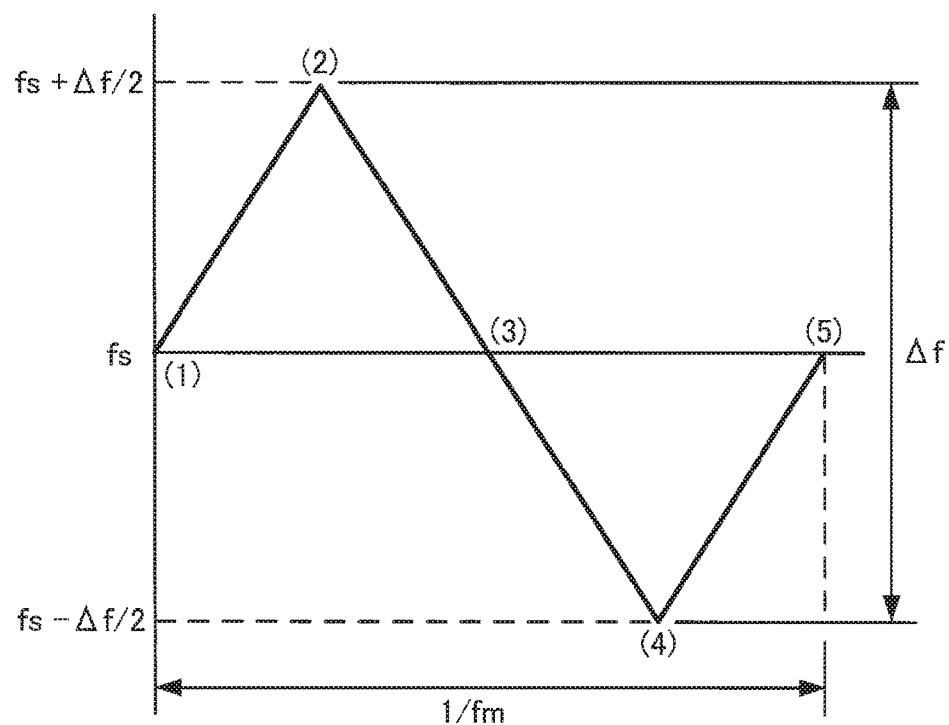
FIG. 27 illustrates a change in modulation frequency relative to a switching frequency.

Operation performed at the time of applying frequency diffusion to a switching frequency will now be described. FIG. 26 illustrates a list of parameters in each state of frequency diffusion. FIG. 27 illustrates a change in modulation frequency relative to a switching frequency.

At the same time that as indicated in FIG. 27, a switching frequency fs is diffused with a width of Δf on the basis of a modulation frequency fm generated by a jitter control circuit 120, the electrostatic capacity of the variable resonance capacitor Cvr is changed. As indicated in FIGS. 26 and 27, the electrostatic capacity of the variable resonance capacitor Cvr is set to (Cr+Crs1) which is the center value of the three values in state (1), (3), or (5) in which a switching frequency is fs corresponding to the center value of diffused frequencies. At this time a voltage Vct inputted to the capacity variable control circuit 14 is between the reference voltages VH and VL. Therefore, the comparator CP1 outputs an H level as a control voltage to turn on the switch S1, and the comparator CP2 outputs an L level as a control voltage to turn off the switch S2.

The electrostatic capacity of the variable resonance capacitor Cvr is set to Cr which is the smallest value of the three values in state (2) in which a switching frequency is (fs+Δf/2) corresponding to the upper-limit frequency value of the diffused frequencies. At this time a voltage Vct inputted to the capacity variable control circuit 14 is higher than the reference voltage VH. Therefore, the comparator CP1 outputs an L level as a control voltage to turn off the switch S1, and the comparator CP2 outputs an L level as a control voltage to turn off the switch S2.

The electrostatic capacity of the variable resonance capacitor Cvr is set to (Cr+Crs1+Crs2) which is the largest value of the three values in state (4) in which a switching frequency is (fs−Δf/2) corresponding to the lower-limit frequency value of the diffused frequencies. At this time a voltage Vct inputted to the capacity variable control circuit 14 is lower than the reference voltage VL. Therefore, the comparator CP1 outputs an H level as a control voltage to turn on the switch S1, and the comparator CP2 outputs an H level as a control voltage to turn on the switch S2.

As has been described, with the LLC converter 1-2 noise is reduced by applying frequency diffusion. However, a change in output voltage caused by applying frequency diffusion to the LLC converter 1-2 is suppressed by changing the electrostatic capacity of the variable resonance capacitor Cvr at the time of exercising diffusion control of a switching frequency. As a concrete example, a diffusion width of ±11% is obtained if Cr=20 nF and Crs1=Crs2=2200 pF. Accordingly, an EMI noise reduction effect is expected.

In the second embodiment switching is performed among the three electrostatic capacity values of the variable resonance capacitor Cvr. However, the number of electrostatic capacity values of the variable resonance capacitor Cvr is not limited to three. The number of electrostatic capacity values of the variable resonance capacitor Cvr may be increased to five, seven, and so on. By increasing the number of electrostatic capacity values of the variable resonance capacitor Cvr and performing switching among them, the electrostatic capacity characteristic of the variable resonance capacitor Cvr approaches to a linear electrostatic capacity characteristic like that of the variable resonance capacitor Cvr in the first embodiment.

According to an aspect, it is possible to reduce noise while suppressing an increase in the number of filters and size and a change in output voltage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus comprising:
    a switching circuit including a first switching element and a second switching element connected in series between input terminals of a source;
    a resonance circuit including an excitation inductor of a primary winding of a transformer, a resonance inductor connected in series with the excitation inductor, and a variable resonance capacitor which is connected in series with the excitation inductor and has an electrostatic capacity that changes according to a control voltage, the resonance circuit being connected in parallel with the second switching element;
    a rectifying circuit connected to a secondary side of the transformer; and
    a control circuit which generates switching signals to be supplied to the first switching element and the second switching element on the basis of a feedback voltage generated from a detection result of an output voltage of the rectifying circuit, by performing a frequency diffusion on a switching frequency of the switching signals, the control circuit generating the control voltage on the basis of the feedback voltage, and outputting the switching signals and the control voltage to change the switching frequency and the electrostatic capacity simultaneously,
    wherein the control circuit includes:
    a voltage detection circuit which detects the output voltage of the rectifying circuit to generate the feedback voltage;
    a voltage-controlled oscillator which changes an oscillation frequency according to a level of the feedback voltage;
    a gate drive control circuit which generates the switching signals, the switching frequency of the switching signals being changed according to the oscillation frequency; and
    a capacity variable control circuit which generates the control voltage, the control voltage having a voltage level that is changed according to the oscillation frequency.

2. The switching power supply apparatus according to claim 1, wherein:
    the switching circuit further includes an input capacitor;
    the rectifying circuit includes a first inductor and a second inductor of a secondary winding of the transformer, a first rectifier diode, a second rectifier diode, and an output capacitor;
    one end of the input capacitor is connected to one of the input terminals and a drain of the first switching element and a source of the first switching element is connected to one end of the resonance inductor and a drain of the second switching element;
    a gate of the first switching element is connected to one gate drive terminal of the control circuit and a gate of the second switching element is connected to another gate drive terminal of the control circuit;
    another end of the resonance inductor is connected to one end of the excitation inductor and another end of the excitation inductor is connected to one end of the variable resonance capacitor;

another end of the input capacitor is connected to another of the input terminals, a source of the second switching element, and another end of the variable resonance capacitor;

a control voltage input terminal of the variable resonance capacitor is connected to an output terminal of the control voltage of the control circuit;

one end of the first inductor is connected to an anode of the first rectifier diode and a cathode of the first rectifier diode is connected to one end of the output capacitor, one output terminal, a cathode of the second rectifier diode, and an output voltage detection terminal of the control circuit; and one end of the second inductor is connected to an anode of the second rectifier diode and another end of the first inductor is connected to another end of the second inductor, a ground terminal of the control circuit, another end of the output capacitor, and another output terminal.

3. The switching power supply apparatus according to claim 1, wherein the voltage-controlled oscillator includes a jitter control circuit which includes a counter for counting a number of input clock signals and which performs the frequency diffusion by modulating the switching frequency on the basis of a modulation frequency corresponding to a bit number of the counter.

4. The switching power supply apparatus according to claim 1, wherein:

the capacity variable control circuit is a frequency-to-voltage conversion circuit including a first capacitor, a second capacitor, a first diode, a second diode, a first resistor, a second resistor, and an operational amplifier;

an oscillating signal outputted from the voltage-controlled oscillator is inputted to one end of the first capacitor and another end of the first capacitor is connected to a cathode of the first diode and an anode of the second diode;

an anode of the first diode is connected to one end of the second capacitor, one end of the first resistor, and a negative side input terminal of the operational amplifier;

an output terminal of the operational amplifier is connected to another end of the second capacitor, another end of the first resistor, one end of the second resistor, and an output terminal of the control voltage; and a cathode of the second diode, a positive side input terminal of the operational amplifier, and another end of the second resistor are grounded.

5. A switching power supply apparatus comprising:

a switching circuit including a first switching element and a second switching element connected in series between input terminals of a source;

a resonance circuit including an excitation inductor of a primary winding of a transformer, a resonance inductor connected in series with the excitation inductor, and a variable resonance capacitor which is connected in series with the excitation inductor and has an electrostatic capacity that changes according to a control voltage, the resonance circuit being connected in parallel with the second switching element;

a rectifying circuit connected to a secondary side of the transformer; and a control circuit which generates switching signals to be supplied to the first switching element and the second switching element on the basis of a feedback voltage generated from a detection result of an output voltage of the rectifying circuit, by performing a frequency diffusion on a switching frequency of the switching signals, the control circuit generating the control voltage on the basis of the feedback voltage, and outputting the switching signals and the control voltage to change the switching frequency and the electrostatic capacity simultaneously, wherein the variable resonance capacitor of the resonance circuit includes:

a resonance capacitor;

at least one set of capacity variable capacitors; and switches which selectively connect the resonance capacitor and the capacity variable capacitors in parallel based on the control voltage.

6. The switching power supply apparatus according to claim 5, wherein the control circuit includes:

a voltage detection circuit which detects the output voltage of the rectifying circuit to generate the feedback voltage;

a voltage-controlled oscillator which changes an oscillation frequency according to a level of the feedback voltage;

a gate drive control circuit which generates the switching signals, the switching frequency of the switching signals being changed according to the oscillation frequency; and a capacity variable control circuit which generates, according to the oscillation frequency, the control voltage, the control voltage being for selectively connecting the switches.

7. The switching power supply apparatus according to claim 6, wherein:

the capacity variable control circuit includes a set of comparators which generates the control voltage for switching the switches at a time of changing the switching frequency in response to receipt of the oscillation frequency generated by the voltage-controlled oscillator.

8. The switching power supply apparatus according to claim 7, wherein:

when the switching frequency is a center value of a band of diffused frequencies, the comparators output the control voltage for turning on one of the switches and turning off another of the switches;

when the switching frequency is an upper limit value of the band of the diffused frequencies, the comparators output the control voltage for turning off each of the switches; and when the switching frequency is a lower limit value of the band of the diffused frequencies, the comparators output the control voltage for turning on each of the switches.

* * * * *